United States Patent
Sakaguchi et al.

(10) Patent No.: US 6,453,008 B1
(45) Date of Patent: Sep. 17, 2002

(54) RADIATION DETECTOR NOISE REDUCTION METHOD AND RADIATION DETECTOR

(75) Inventors: Takuya Sakaguchi, Otawara (JP); Seiichiro Nagai, Otawara (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 179 days.

(21) Appl. No.: 09/628,282

(22) Filed: Jul. 28, 2000

(30) Foreign Application Priority Data

Jul. 29, 1999 (JP) .......................................... 11-215214

(51) Int. Cl.[7] ................................................. H05G 1/64
(52) U.S. Cl. ...................... 378/98.7; 378/98.2; 378/207; 250/370.09
(58) Field of Search .............................. 378/98.7, 98.2, 378/207; 250/370.11, 370.09

(56) References Cited

U.S. PATENT DOCUMENTS

| 5,648,660 A | | 7/1997 | Lee et al. | |
|---|---|---|---|---|
| 5,962,856 A | * | 10/1999 | Zhao et al. | ............. 250/370.02 |
| 6,118,846 A | * | 9/2000 | Liu | ............................ 378/62 |
| 6,160,260 A | * | 12/2000 | Yamayoshi et al. | ..... 250/370.09 |
| 6,351,519 B1 | * | 2/2002 | Bonk et al. | ............ 250/370.09 |

FOREIGN PATENT DOCUMENTS

| JP | 9-197053 | | 7/1997 |
|---|---|---|---|
| JP | 10170656 A | * | 6/1998 |

* cited by examiner

Primary Examiner—David V. Bruce
Assistant Examiner—Pamela R. Hobden
(74) Attorney, Agent, or Firm—Oblon, Spivak, McClelland, Maier & Neustadt, P.C.

(57) ABSTRACT

A radiation detector noise reduction method includes the step of detecting incident radiation with a radiation detecting section, the radiation detecting section having a plurality of pixels arrayed in the form of a matrix, reading out the detection signal from the radiation detecting section through a readouting section, and correcting the readout detection signal with a correction section, wherein the correction step includes the first sub-step of correcting the detection signal on the basis of a first correction value corresponding to noise originating in the radiation detecting section, and the second sub-step of correcting the detection signal on the basis of a second correction value corresponding to noise originating in the readouting section, the second sub-step being executed before the first sub-step.

35 Claims, 8 Drawing Sheets

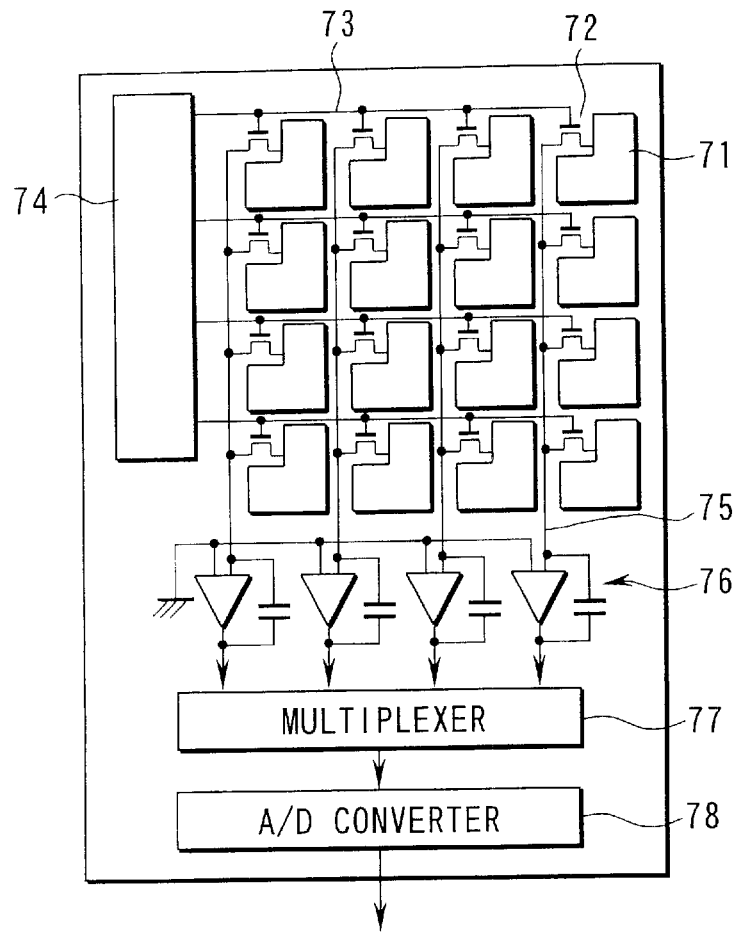
FIG. 1 PRIOR ART
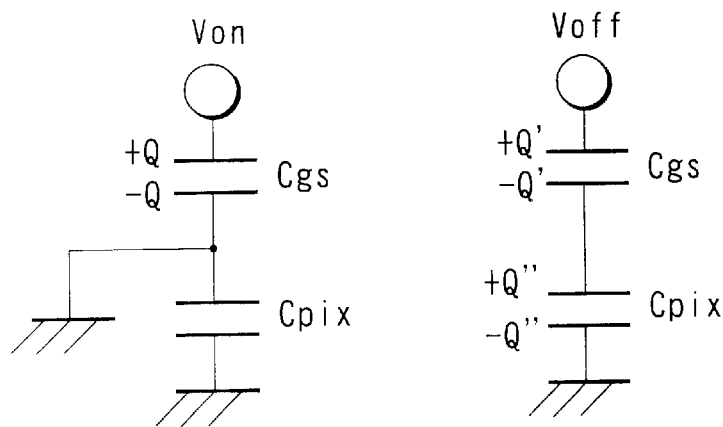
FIG. 2A
PRIOR ART
FIG. 2B
PRIOR ART

RADIATION DETECTOR NOISE REDUCTION METHOD AND RADIATION DETECTOR

CROSS-REFERENCE TO RELATED APPLICATIONS

This application is based upon and claims the benefit of priority from the prior Japanese Patent Application No. 11-215214, filed Jul. 29, 1999, the entire contents of which are incorporated herein by reference.

BACKGROUND OF THE INVENTION

The present invention relates to a noise reduction method for a radiation detector for converting radiation such as X-rays into an electrical signal in accordance with its intensity.

A planar type radiation detector has a plurality of pixels arrayed in the form of a matrix. Each pixel has a photoelectric conversion element and pixel electrode. When radiation is incident on the photoelectric conversion element, the photoelectric conversion element generates charge in an amount corresponding to the incident intensity. This charge is stored in a capacitor through the pixel electrode. The stored charge is read out from the capacitor through a readouting section.

FIG. 1 is a view showing a typical example of the arrangement of a conventional radiation detector. Referring to FIG. 1, a plurality of pixel electrodes 71 arranged in the form of a two-dimensional matrix acquire charge generated in photoelectric conversion films in accordance with the intensity of radiation that has passed through an object and struck on the films. A capacitor used as a charge storage element for storing the acquired charge (pixel charge) is connected to each pixel electrode 71. The pixel charge stored in the each capacitor is read out through a thin-film transistor (TFT) 72.

A gate line driver 74 selectively applies a gate voltage to a gate line 73 to turned on the gates of the TFTs 72. A plurality of TFTs 72 connected to the selected gate line 73 are simultaneously turned on. Capacitor charges on the same row are read out as electrical signals (to be referred to as detection signals hereinafter) to amplifiers 76 through signal lines 75. Thereafter, the amplified detection signals are sequentially sent to an A/D converter 78 through a multiplexer 77.

Note that a layer on which the above gate lines 73 are laid to be parallel to each other and a layer on which the signal lines 75 are laid to be parallel to each other are overlaid in a direction perpendicular to the drawing surface of FIG. 1 through an insulating layer. That is, the gate lines 73 and signal lines 75 are formed on different layers so as not to be short-circuited.

In general, such radiation detectors digitize radiation images and hence are very advantageous in terms of, for example, transmission, storage, and search of radiation images as compared with conventional radiation photographic films. It is expected that these detectors will become more popular. The above radiation detector designed to directly digitize radiation has the merit of easily obtaining digital images as compared with a conventional film digitizer scheme and the like.

In the above conventional planar type radiation detector, noise components that become "disturbance factors" are superimposed on detection signals. In general, this makes it difficult to obtain accurate object information. In this case, as the "disturbance factors", the following two factors are conceivable.

The first factor is associated with a "dark image". It is known that in the photoelectric conversion film provided for the pixel electrode 71, a current generally called a "dark current" is generated owing to, for example, the random thermal agitation of free electrons even when no radiation is incident. In addition, in general, an offset noise voltage is always observed in the amplifier 76. These dark currents and offset noise voltages are finally constructed into images through the signal lines 75 and amplifiers 76, thereby forming "dark images".

For this reason, an image constructed on the basis of a detection signal having undergone no correction processing is the one obtained by superimposing the above dark image on a normal desired image. In order to obtain an accurate image, therefore, information associated with the dark image must be subtracted from the overall information.

Such an inconvenience has been recognized in the conventional scheme as well, and hence a method of acquiring correction information associated with a dark image in advance and subtracting it from detected information has been proposed. In general, however, the above dark current and offset noise voltage vary with temperatures, and the dark image changes accordingly. For this reason, the above method is not very effective. That is, since correction information is fixed, this method cannot cope with an actual condition (temperature) that incessantly changes over the operation time of the radiation detector and the like.

In addition, dark images change depending on the method of driving the gate lines 73 and TFTs 72. This is because the TFT 72 is not an ideal switching element, which has finite resistances in both ON and OFF states. This characteristic poses the following problem. A current or charge information that should be obtained in accordance with an array driving sequence dissipates or unnecessary components are added thereto. Consider a general sequence as a driving sequence, in which the ith gate line 73 is driven (the TFTs 72 on this line are turned on) to extract charge information from the corresponding pixel electrodes 71, and then the (i+1)th gate line 73 is driven at the same time when the driving of the ith gate line 73 is stopped (TFTS 72 are turned off). Current dissipation and addition may occur in the following two cases.

In the first case, a current dissipates as the TFTs 72 on the ith line are turned on and off. This is because the potential of the signal line 75 is equal to that of the pixel electrode 71 when the TFT 72 is turned on, but the potential of the pixel electrode 71 drops when the TFT 72 is turned off. This will be described in detail below. As shown in FIG. 2A, when the TFT 72 is ON, the charge given by $$Q = C_{gs} \cdot V_{on}$$

is stored in a capacitor (capacitance Cgs) assumed to be formed on the source side of the TFT 72. At this time, as obvious from FIGS. 1 and 2A, the node of a capacitor (capacitance Cpx) provided for the pixel electrode 71 and the capacitor Cgs is grounded (GND level). Considering that the node is disconnected from the GND level when the TFT 72 is turned off, and charge Q stored in the capacitor Cgs is distributed into the capacitors Cpx and Cgs, the following relation is established (refer to FIG. 2B):

$$-Q = -Q' + Q''$$

$$V_{off} - Q'/C_{gs} - Q''/C_{px} = 0$$

where Q' is the charge of the capacitor Cgs, and Q" is the charge of the capacitor Cpx. From the above three equations, the charge Q" stored in the capacitor Cpx can be given by $$Q''=-C'\cdot(Von-Voff)$$

where C'=Cpx·Cgs/(Cpx+Cgs).

In this state, the potential of the capacitor Cpx, i.e., a potential V of the pixel electrode 71, is given by $$V=Q''/Cpx=-(C'/Cpx)\cdot(Von-Voff)$$

and Von>Voff generally holds. Therefore, V<0. That is, when the TFT 72 is turned off, the potential drops.

As described above, when the potential of the pixel electrode 71 drops as the TFT 72 on the ith line is turned on/off, a voltage is applied between the source and drain of the TFT 72. Obviously, a current is generated in this portion. As a consequence, excess charge is stored in the pixel electrode 71. When the ith gate line 73 is driven again, this excess charge information is additionally read out. This makes it impossible to obtain accurate information. Note that such charge addition will be referred to as "first type offset noise" hereinafter for the sake of convenience.

In the second case, assuming that the (i+1)th gate line 73 is driven, all the remaining gate lines 73, as well as the ith gate line 73, are not driven. In this state, it is expected that all the charge information stored in the pixel electrodes 71 connected to the (i+1)th gate line 73 will reach the multiplexer 77 through the signal lines 75. However, since the signal lines 75 are connected to all the gate lines 73 other than the (i+1)th gate line 73, currents flow to them. The currents flowing to the gate lines 73 other than the (i+1th) gate line 73 are stored as excess charges in the pixel electrodes 71. Therefore, when charge information is read out, unnecessary information is added to the charge information, and hence accurate information cannot be obtained as in the above case. Note that such charge addition will be referred to as "second type offset noise" hereinafter for the sake of convenience. Obviously, the above description about the (i+1)th gate line applies to a case wherein any of the remaining gate lines is driven. That is, every time a gate line is driven, the charge that causes second type offset noise generally increases.

As described above, information (detection signal) associated with an image obtained through the multiplexer 77 is obtained with first type offset noise and second type offset noise being added thereto. As is obvious from the above description, these "amounts" depend on the gate line driving method and the like, and hence are not always constant (this will be described in detail in "DETAILED DESCRIPTION OF THE INVENTION"). The sum of first type offset noise and second type offset noise singly forms a dark image, and influences a dark image that originates from the above dark current and offset noise. As a consequence, this causes incessant variations in dark image. When an accurate image is to be obtained, a dark image must be corrected in consideration of such variations, and the variations must be coped with.

The second factor as a "disturbance factor" is associated with the production of a noise component. In the above description, the gate lines 73 and signal lines 75 are formed on the different layers through the insulating layer in the planar type radiation detector. In this arrangement, each gate line 73 and the corresponding signal line 75 inevitably have an intersection. This intersection serves as a capacitance (capacitor). In practice, if the voltage of each signal line 75 is constant, charge is stored in the intersection capacitance owing to the voltage of the gate line 73.

In such a case, assuming that an ideal state is set, for example, the voltage of each gate line 73 is constant. In this case, the amount of charge stored in the intersection is constant, and no significant problem arises. In practice, however, the voltage of each gate line 73 fluctuates, and the charge stored in the intersection capacitance varies over time. Such a change in charge is transferred to the signal line 75 and becomes a "noise component" in the detection signal. As this noise component, the same voltage variation is added to the pixel electrodes 71 connected to the same gate line 73. As a consequence, identical noise components are uniquely added to the respective rows of the matrix.

Since this noise appears as an artifact in the form of a transverse line on an image in correspondence with a gate line, the noise is generally called "line artifact noise" in some cases. In this specification, to indicate noise in the above form, the term "line artifact noise" is used, and the amount of this noise is represented by $n_{(i)}$. In this case, the subscript "i" indicates the ith row of the matrix.

A means for correcting the line artifact noise $n_{(i)}$ has already been proposed in Jpn. Pat. Appln. KOKAI Publication No. 9-197053. According to this proposal, the line artifact noise $n_{(i)}$ (this noise is called "common mode noise" instead of "line artifact noise") is corrected by subtracting an output from a shield pixel which is shielded against radiation from an output from a non-shield pixel on which radiation is incident as in a normal case.

According to this means, an output signal which is expected to contain noise added to an output from a shield pixel, e.g., noise added in a subsequent circuit after readout operation, is subtracted from an output signal from a non-shield pixel without correcting the noise. There is therefore a chance that noise may be increased to result in difficulty in obtaining correct information.

As described above, all the disturbance factors described above become hindrances to the acquisition of accurate images. Therefore, correction must be properly executed in accordance with the characteristics of the above disturbance factors instead of using the obtained detection signal without any change.

In this case, in accordance with a finding that indicates a specific portion in the radiation detector in which the above disturbance factor is caused, correction may be performed by using gain noise (undesired amplification factor), offset noise (undesired offset amount) associated with "only" this portion, or the like. This operation has greater significance in obtaining an accurate image. Consider, for example, the above dark images, i.e., the dark image due to the dark current in the photoelectric conversion film and the dark image due to the amplifier 76. The former is produced in the radiation detecting section, and the latter is produced in the readouting section. That is, they are produced in different portions. In addition, the radiation detector and readouting section respectively have unique gain noise and offset noise amounts. If, therefore, these values can be separately obtained from the respective portions, the acquisition of these values can contribute to proper correction. In the prior art, however, since the amplifier input capacitance of each signal line 75 based on an output form the radiation detecting section is large, the S/N ratio decreases. It is therefore taken for granted that gain noise or offset noise associated with only the radiation detecting section or readouting section is difficult to acquire.

BRIEF SUMMARY OF THE INVENTION

It is an object of the present invention to provide a noise reduction method and radiation detector which can efficiently reduce not only noise due to a dark current and offset noise but also line artifact noise due to variations in voltage applied to each gate line over time.

According to the present invention, there is provided a radiation detector noise reduction method comprising the steps of detecting incident radiation with a radiation detecting section, the radiation detecting section having a plurality of pixels arrayed in the form of a matrix, reading out the detection signal from the radiation detecting section through a readouting section, and correcting the readout detection signal with a correction section, wherein the correction step includes the first sub-step of correcting the detection signal on the basis of a correction value corresponding to noise originating in the radiation detecting section, and the second sub-step of correcting the detection signal on the basis of a correction value corresponding to noise originating in the readouting section, the second sub-step being executed before the first sub-step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a circuit diagram showing the arrangement of a conventional radiation detector;

FIG. 2A is a circuit diagram for sequentially explaining a mechanism for a drop in potential of a pixel electrode at the time of a charge readout which causes first type offset noise in the prior art;

FIG. 2B is a circuit diagram for sequentially explaining a mechanism for a drop in potential of a pixel electrode after a charge readout which causes first type offset noise in the prior art;

DETAILED DESCRIPTION OF THE INVENTION

Preferred embodiments of the present invention will be described below with reference to the views of the accompanying drawing.

First Embodiment

A radiation detector Q according to the first embodiment is a main component mounted in a modality such as an X-ray diagnosis apparatus for generating X-ray projection images or an X-ray computer tomography apparatus for reconstructing slice image data (X-ray absorption distribution) from X-ray projection data.

Figure 3:
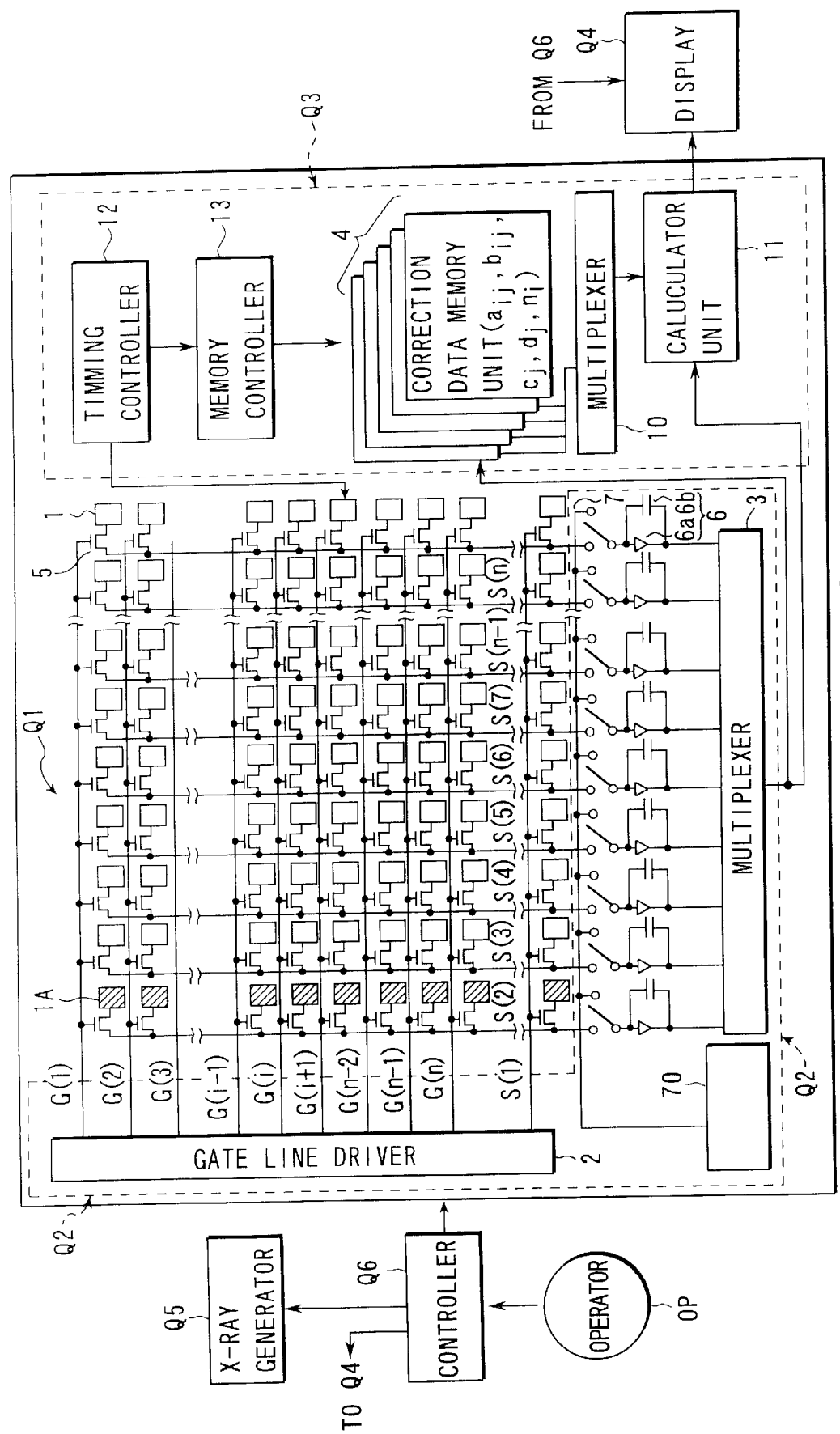
FIG. 3 is a circuit diagram showing the arrangement of a radiation detector according to the first embodiment of the present invention.

As shown in FIG. 3, the radiation detector Q is comprised of a radiation detecting section Q1 signal readouting section Q2, and image acquiring section Q3. The radiation detecting section Q1 has a plurality of pixels arrayed in the form of a matrix. Each pixel has a photoelectric conversion element and pixel electrode 1. When radiation strikes the photoelectric conversion element, charge is generated in the photoelectric conversion in an amount corresponding to the incident intensity of the radiation. This charge is stored in a capacitor via the pixel electrode. The signal readouting section Q2 has a gate line driver 2 and multiplexer 3. The image acquiring section Q3 has a correction data memory unit 4.

Each pixel electrode 1 in the radiation detecting section Q1 is boded to a photoelectric conversion film. When radiation strikes the photoelectric conversion film, it generates charge in an amount corresponding to the intensity of the radiation. The charge is stored in a stacked capacitor (storage element) via the pixel electrode 1.

As schemes of converting the above radiation intensity (radiation information) into charge information, direct and indirect conversion schemes are available. The former uses an amorphous selenium (Se) layer as the above photoelectric conversion film, which functions as a photoconductor under high electric field strength. The latter uses a scintillation layer made of a cesium iodide (CsI) crystal for temporarily converting an incident radiation into light.

Figure 4:
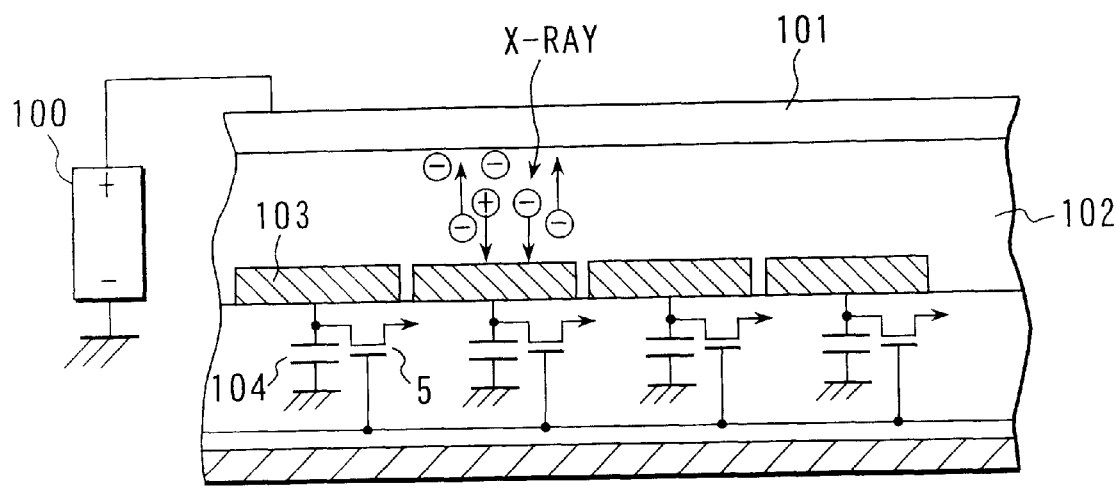
FIG. 4 is a cross-sectional view showing the arrangement of a portion near a pixel electrode based on the direct conversion scheme in the first embodiment of the present invention.

The former direct conversion scheme has, for example, the arrangement shown in FIG. 4. When radiation strikes an amorphous selenium layer 102 while a high voltage is applied from a power supply 100 to a voltage application electrode 101, the incident radiation contributes to the generation of charge. The charge is then stored in a capacitor 104 provided for each pixel via a charge storage electrode 103. The arrangement shown in FIG. 4 therefore has the function of directly converting radiation into charge.

Figure 5:
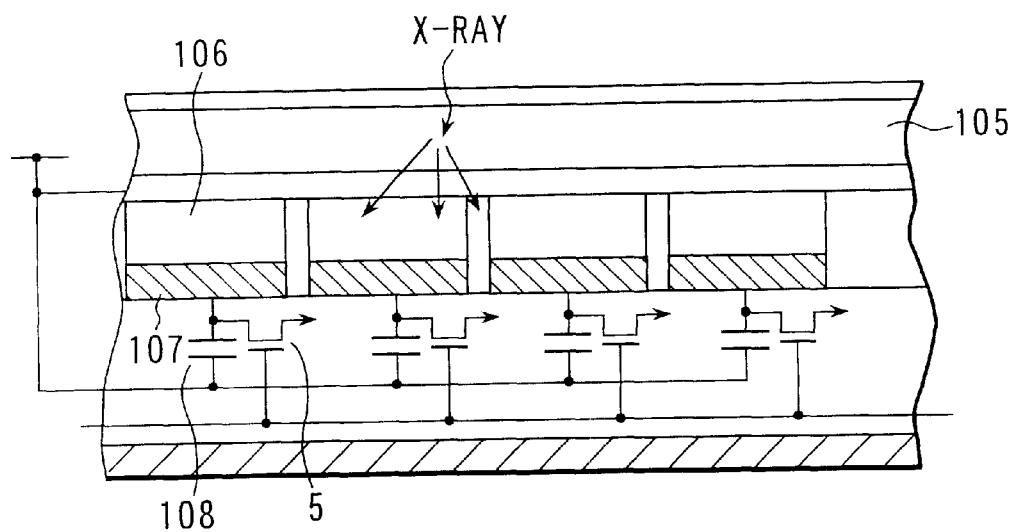
FIG. 5 is a cross-sectional view showing the arrangement of a portion near a pixel electrode based on the indirect conversion scheme in the first embodiment of the present invention.

The latter indirect conversion scheme has, for example, the arrangement shown in FIG. 5. Radiation that strikes a scintillation layer 105 is temporarily converted into light. A photodiode 106 then converts the light into change in an amount corresponding to the intensity of the light. The converted charge is stored in a capacitor 108 of each pixel via a charge storage electrode 107. The arrangement shown in FIG. 5 therefore has an indirect conversion function, i.e., a radiation/light/charge conversion function. In this case, the charge storage electrodes 103 and 107 each correspond to the pixel electrode 1, the capacitors 104 and 108 each correspond to the storage capacitor, and the amorphous selenium layer 102 in FIG. 4 and the combination of scintillation layer 105 and photodiode 106 in FIG. 5 each correspond to the conversion element.

According to the present invention, either the direct scheme or the indirect scheme can be used. In addition, the materials described above (selenium and cesium iodide) are merely examples, and the present invention is not limited to them.

As shown in FIG. 3, a plurality of such pixel electrodes 1 are prepared and arrayed in the form of a matrix. Of these pixel electrodes 1, the pixel electrodes 1 arranged on the leftmost column of the matrix are substantially shielded against radiation. Each such pixel electrode 1 will be referred to as a shield pixel electrode 1A. The pixel electrodes 1 on the remaining columns are not shielded.

In this case, the expression "substantially shielded" indicates a structure for realizing a state wherein "no radiation strikes" each shield pixel electrode 1A or "charge generated upon incidence of radiation does not reach the pixel electrode". The present invention is not limited to any specific means for realizing such a state. That is, any means can be used as long as a state wherein "substantially shielded" can be realized. As a simplest means, a "cover" made of lead or the like that has the function of blocking radiation may be formed on each pixel electrode. According to another means, for example, in the arrangement shown in FIG. 4, no voltage application electrode 101 is provided for the first column portion of the matrix to substantially eliminate the radiation/charge conversion function, thereby realizing a state wherein "shielded". The word "shield" in the present invention includes such a concept.

Obviously, in the present invention, the position of each shield pixel electrode 1A is not limited to the leftmost column of the matrix. That is, each shield pixel electrode 1A can be basically positioned on an arbitrary column. More specifically, for example, these electrodes can be positioned on the rightmost column of the matrix. In addition, since there is no reason to arrange the shield pixel electrodes 1A on only one column, they can be arranged on both left columns and right columns of the matrix.

Prior to a description of correction, note that reference symbol "i" indicates a row number in the matrix of the pixel electrodes 1; and reference symbol "j", a column number in the matrix.

All these pixel electrodes 1 and 1A can be electrically connected to each other through gate lines $G_{(i)}$ ($G_{(1)}$, $G_{(2)}$, ..., $G_{(n)}$) in the row direction of the matrix, and through signal lines $S_{(j)}$ ($S_{(1)}$, $S_{(2)}$, ..., $S_{(n)}$) in the column direction, or can be connected to each other through thin-film transistors (TFTS) (to be described later).

In the following description, unless otherwise specified, reference symbol "G" indicates all the gate lines $G_{(1)}$, $G_{(2)}$, ... $G_{(n)}$, and reference symbol "S" indicates all the signal lines $S_{(1)}$, $S_{(2)}$, $S_{(n)}$.

Figure 6:
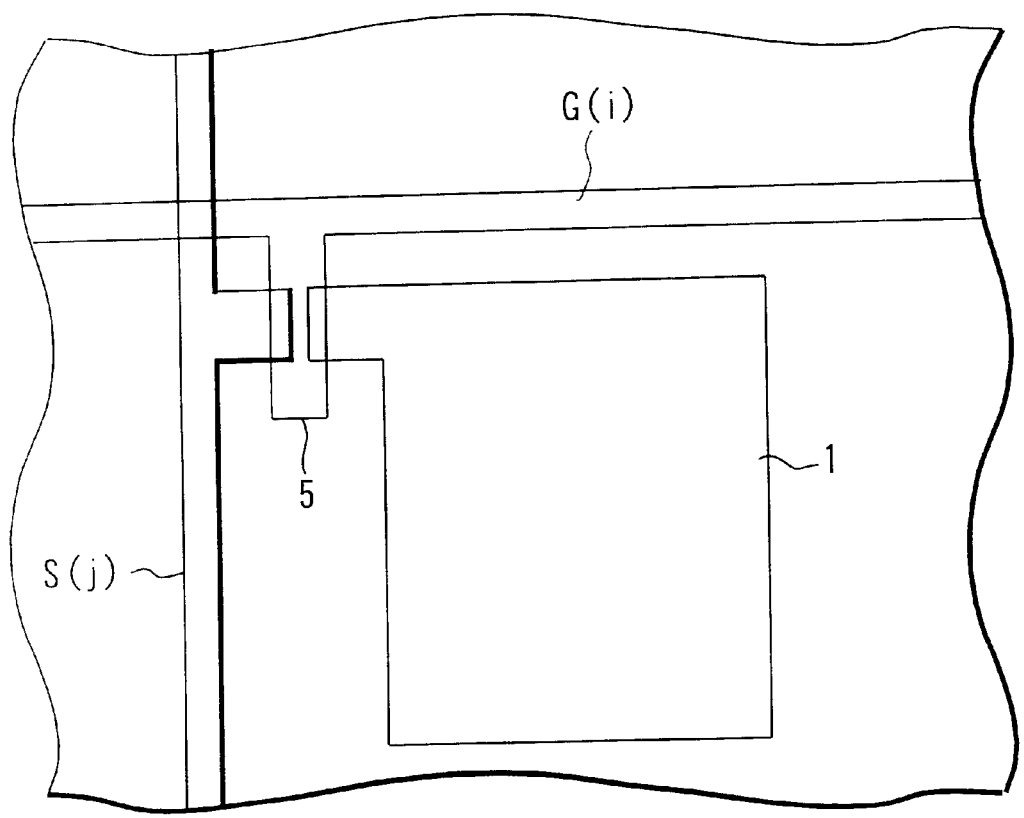
FIG. 6 is an enlarged plan view of a portion near a pixel electrode in the first embodiment of the present invention.

The gate line driver 2 in the signal readouting section Q2 controls the driving sequence of the gate lines G to allow charge information to be orderly read out. This control is performed by ON/OFF-controlling thin-film transistors (TFTs) 5 interposed between the storage capacitors provided for the respective pixel electrodes 1 and 1A by sending control signals to the gate lines G and the TFTs 5. That is, the TFTs 5 serve as switching elements for reading out charge information from the storage capacitors (see FIG. 6). Obviously, charge information in this case is information unique to each storage capacitor and obtained by independently converting each radiation information (radiation intensity), independently obtained by each pixel electrode 1, through each photoelectric conversion film. As is apparent, however, charge information about each shield pixel electrode 1A is not the one obtained by converting radiation information.

The multiplexer 3 is connected to the respective signal lines S via amplifiers 6. The multiplexer 3 receives signals sent through the signal lines S in units of columns and selects a signal, and outputs the selected signal as a detection signal to the succeeding circuit or the like. In this case, each amplifier 6 is comprised of an integrating amplifier 6a and a capacitor 6b connected in parallel therewith, as shown in FIG. 3. The amplifiers 6 are arranged for the respective signal lines S outside the two-dimensional matrix. These amplifiers 6 amplify output signals output from the pixel electrodes 1 and 1A positioned on the respective rows of the matrix and acquired in units of columns.

Figure 7:
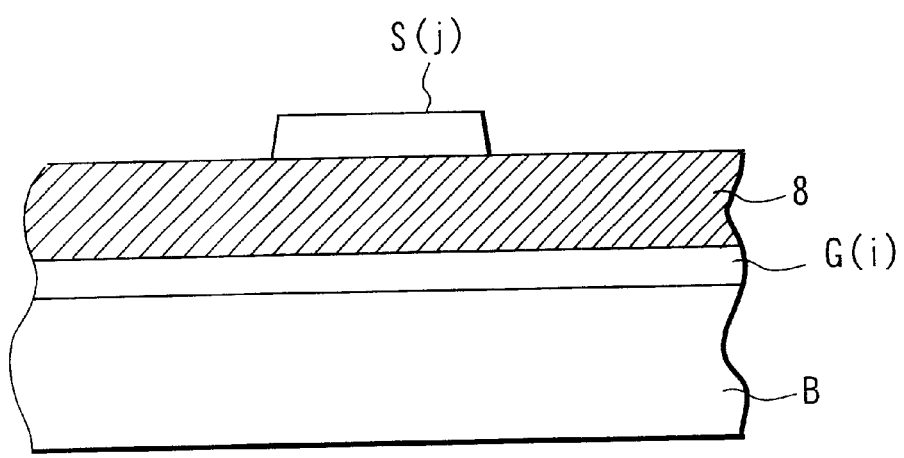
FIG. 7 is a cross-sectional view showing a layer structure associated with gate and signal lines in the first embodiment of the present invention.

As shown in FIG. 7, the respective layers on which the above gate lines G and signal lines S are laid are relatively located at upper and lower positions when the above matrix is viewed along the section. In the case shown in FIG. 7, the layer of the gate lines $G_{(i)}$ is located below the layer of the signal lines $S_{(j)}$. However, an insulating layer 8 is formed between the two layers to prevent short circuits between the gate lines $G_{(i)}$ and the signal lines $S_{(j)}$. This multilayer structure is placed/fixed on a substrate B made of glass.

As shown in FIG. 3, the correction data memory unit 4 in the image acquiring section Q3 has a plurality of correction data memories. The output of the multiplexer 3 is connected to the input of the correction data memory unit 4. These memories are used to obtain correction data (b, c, and d) associated with dark images constituted by dark currents generated in the photoelectric conversion film, offset noise voltages in the amplifiers 6, and the like, which can be checked while no radiation is incident on the pixel electrodes 1, together with other correction data (a and n). The memories are also used to store these data singly stored or an arbitrary combination of calculation results on them which are obtained in accordance with correction procedures.

The correction data memory unit 4 is a means for correcting a detection signal Z from the multiplexer 3 on the basis of correction data supplied from the correction data memory unit 4. The output of the correction data memory unit 4 is connected to a calculator unit 11 via the combined cycle power plant 10. The calculator unit 11 has a plurality of calculators (difference calculators D and multipliers M) for implementing a correction procedure for the detection signal Z, which will be described later. The connection relationship between these calculators is designed in accordance with the correction procedure. These calculators will be described in detail later.

Image data X having undergone this correction is sent to a display Q4. In this case, the display Q4 is a section having a CRT apparatus and the like and designed to reconstruct an image on the basis of sent information. For this section, a generally known apparatus and arrangement will suffice. Obviously, the present invention is not limited to a CRT apparatus and the like.

For the correction data memory unit 4, in order to provide the timing of acquisition of information associated with the above dark image, a timing controller (monitor) 12 for monitoring or observing the state of incidence of radiation in the radiation detecting section Q1 and pixel electrodes 1 is provided, together with a memory controller 13 for substantially determining storing operation of the correction data memory unit 4 on the basis of an instruction from the timing controller 12. Note that the timing controller 12 is basically designed to always monitor the presence/absence of radiation incident on the radiation detecting section Q1 while the diagnosis apparatus Q is operating.

The radiation detecting section Q1, signal readouting section Q2, and image acquiring section Q3, which have been described so far, constitute the "planar type radiation detector" of this embodiment. Unlike the prior art, this radiation detector has a structure in which the radiation detecting section Q1 and signal readouting section Q2 can be electrically disconnected from each other. This structure can be implemented by using, for example, an electric switch (means that allows these sections to be electrically disconnected from each other) 7 as shown in FIG. 3, or a jumper pin (not shown).

Since the radiation detecting section Q1 and signal readouting section Q2 can be electrically disconnected from each other in this manner, readouting section gain noise (an unintentional, undesired amplification factor) and readouting section offset noise (an unintentional, undesired offset amount) associated with only the signal readouting section Q2 can be obtained. More specifically, the above gain noise and offset noise can be obtained by supplying a calibration input (a predetermined input signal) to the signal readouting section Q2 using a calibration signal generator 70 and the electric switch 7, while the two sections are actually disconnected from each other, and reading an output signal. These values are used as correction amounts in obtaining an accurate image. This will be described later in the description of the function (these noises will be referred to as readout gain noise $c_{(i)}$ and readouting section offset noise $d_{(i)}$ later).

In addition to the above arrangements, the X-ray diagnostic system Q according to this embodiment includes a radiation generator Q5 for generating radiation applied onto an object in a normal state and a controller Q6 for systematically controlling the radiation generator Q5, radiation detecting section Q1, signal readouting section Q2, image acquiring section Q3, and displaying section Q4 and generating instructions to the respective sections to execute proper processing, e.g., automatic operation performed by the respective section in coordination with each other, as needed. The respective sections Q1 to Q5 are designed to automatically operate in a normal state under the control of the controller Q6. However, an operator OP can directly access the controller Q6 in mode selection (to be described later) and the like. For this purpose, the controller Q6 has terminals (not shown) such as a keyboard.

A correction procedure taken by the radiation detector Q will be described below, together with the detailed arrangement of the calculator unit 11.

Prior to a detailed description of the correction procedure and arrangement, a predetermined number of modes (charge information readout forms) associated with gate line G driving methods defined in this embodiment will be described. In general, these modes are determined before all operations. In this embodiment, for example, the following five modes are prepared:

mode ①: a mode of sequentially reading out information from all the gate lines G in units of gate lines (first charge information readout form), mode ②: a mode of driving the gate lines G two at a time (turning on the TFTs 5 on the two lines), like the gate lines $G_{(i)}$ and $G_{(i+1)}$, $G_{(i+2)}$ and $G_{(i+3)}$, ..., and reading out information while performing line addition (second charge information readout form), which mode is used for an examination that demands a high frame rate even with a slight decrease in the resolution of an image, like a fluoroscopic examination, mode ③: a mode of reading out information from only some of all the n gate lines G (third charge information readout form), which mode is used when the overall size of the detector is larger than the field of view that is required for an examination and in which the vertical period is shorter than that in mode ①, mode ④: a mode of increasing the frame rate by shortening the readout time per line (fourth charge information readout form), which mode is used for fluoroscopic operation or the like mode ② and in which the horizontal period is shorter than that in mode ①, and mode ⑤: a mode of prolonging the radiation time (vertical blanking period), which mode is used for an examination that demands a sufficient dose of radiation and in which the vertical period is longer than that in mode ①.

In the above description, the "horizontal period" is the time during which one gate line $G_{(i)}$ is driven. That is, this period is the interval between the instant at which the respective TFTs 5 connected to one gate line $G_{(i)}$ are turned on to start reading out charge information from the capacitors connected to the TFTs and the instant at which the information is completely read out. In addition, the "vertical period" is the time during which charge information is read out from the capacitors connected to all the gate lines G as readout targets. That is, this period is the period obtained by adding the vertical blanking period to the interval between the instant at which a readout of charge information from the pixel electrodes 1 (readout targets) of the overall matrix is started and the instant at which the readout is completed.

This definition will clarify the meanings of the vertical and horizontal periods mentioned in association with the relationship between mode ① and modes ③, ④, and ⑤. The reason why the vertical period in mode ③ is shorter than that in the mode ① is that it is only required in mode ③ to read out electrical information associated with only some of the gate lines. Obviously, for this reason, the vertical period in mode ③ becomes shorter than that in mode ① of reading out information from the overall matrix. Note that mode ⑤ can be recognized as a mode that differs in nature from modes ① to ④. That is, the vertical period in mode ⑤ becomes long owing to the influences of the readout scheme of the radiation generator Q5 rather than the influences of the driving form of the gate lines G.

Although the differences between the horizontal and vertical periods in the respective modes influence the "amounts" of first type offset noise and second type offset noise described in "BACKGROUND OF THE INVENTION", a detailed description thereof will be made later.

Information associated with these modes is stored in a memory (not shown) in the controller Q6. The operator OP selects an arbitrary one of the modes and inputs the corresponding information to the controller Q6 by using the above terminal. The controller Q6 then automatically operates the respective sections Q1 to Q5 in accordance with the selection and a program, sequence, or procedure prepared for the mode.

If one of the five modes described above indicates the form of operation actually performed on the diagnosis apparatus Q, this state will be referred to as a "radiation image acquisition state" hereinafter.

A case wherein mode ① is selected will be mainly described on the premise given above. The mechanism/function of the radiation generator Q5 for generating radiation, the function of converting radiation intensity into charge information in the photoelectric conversion film of each pixel electrode 1 in radiation detecting section Q1, and the like are irrelevant to the gist of the present invention, and hence a description thereof will be omitted.

Assume that the radiation incidence period has come to an end in each pixel, and charge is stored in each pixel. In order to read out charge information from each pixel according to the procedure in mode ①, the gate line driver 2 drives the first gate line $G_{(1)}$ of the matrix. That is, the TFTs 5 on the scanning line $G_{(1)}$ are turned on to read out charge information from the pixel electrodes 1 connected thereto. When this operation completes (the horizontal period comes to an end), the gate line driver 2 stops driving the scanning line $G_{(1)}$ and starts driving the scanning line $G_{(2)}$. Subsequently, this operation is repeated in the same manner as described above until a readout up to the scanning line $G_{(n)}$ completes (the vertical period comes to an end). In brief, the driving method associated with mode ① is generally a method of sequentially driving the gate lines $G_{(i)}$ (i=1, . . . , n), starting from i=1, and not driving the remaining gate lines $G_{(1)}$, $G_{(2)}$, . . . , $G_{(i-1)}$, $G_{(i+1)}$, . . . , $G_{(n)}$.

Note that the charge information read out in this manner still contains unnecessary information, e.g., information associated with dark images and line artifact noise, which incessantly change. In this charge information readout operation, outputs from the shield pixel electrodes 1A are simultaneously obtained. These outputs are used to calculate line artifact noise $n_{(i)}$ (to be described later).

Assume that the readout of charge information from all the pixel electrodes 1 is completed in the above manner and no radiation is incident on the pixel electrodes 1 (the radiation image acquisition state comes to an end). This state is immediately detected by the timing controller 12 in the image acquiring section Q3. Upon reception of the corresponding information (=incidence of no radiation), the memory controller 13 starts dark image data acquisition processing in each mode described above. In this processing, the memory controller 13 performs so-called "idle read" with respect to each pixel electrode 1 while sequentially executing modes ① to ⑤ without incidence of radiation, and stores the dark image data obtained by the ideal read in the corresponding memories in the correction data memory unit 4 in units of modes while keeping the correspondence between the data and the modes in which they are obtained. As a result of this "idle read", dark images due to dark currents in the photoelectric conversion films, offset noise voltages in the amplifiers 6, and the like are obtained. This operation is cyclically repeated in modes ① to ⑤. That is, when operation in mode ⑤ is completed, operation in mode ① is started. This form of operation will be referred to as a "dark image acquisition state" hereinafter.

The reason why dark images in the respective modes are separately acquired in the single correction data memory unit will be described below. This is because dark images differ or vary in different manners depending on the modes. More specifically, first type offset noise and second type offset noise, described in "BACKGROUND OF THE INVENTION" differ in their contents or components depending on the modes. As described above, in brief, first type offset noise is an unnecessary charge build-up produced by ON/OFF-operation of the TFTs 5 of the pixel electrodes 1. Second type offset noise is an unnecessary charge build-up stored in the pixel electrodes 1 owing to currents distributed to the respective gate lines $G_{(i)}$ through the signal lines S in charge readout operation. As is obvious from the above description as well, these components are greatly influenced by the driving form (e.g., mode) of the gate lines G. More specifically, the "amount" of first type offset noise varies with a change in "horizontal period", whereas that of second type offset noise varies with a change in "vertical period". Compare, for example, modes ① and ④. Since the charge information readout time (horizontal period) per gate line $G_{(i)}$ in the latter mode is "shorter" than that in the former mode, the ON/OFF period of each TFT 5 in one mode differs from that in the other mode. As a consequence, the amount of first type offset noise in one mode differs from that in the other mode. Compare modes ① and ⑤. As described above, the vertical period in the latter mode is longer. It can therefore be easily expected that the amount of second type offset noise stored in the overall matrix within "one vertical period" in one mode differs from that in the other mode. According to the above description, the reason why a long vertical period is set in mode ⑤ slightly differs from that in other modes ① to ④ and influenced by the readout scheme of the radiation generator Q5. Obviously, however, it does not means that this description falls outside the concept of the word "readout scheme" in the present invention.

As described above, since dark images unique to the respective modes are formed, the dark images unique to the respective modes must be accurately grasped to effectively reduce dark image components while guaranteeing the execution of arbitrary mode switching operation. This is the reason why dark images in the respective modes are separately acquired in the single correction data memory unit.

When the timing controller 12 detects, during operation in this "dark image acquisition state", that radiation is to be incident on the pixel electrodes 1 again for some reason, e.g., inputting of an instruction to resume radiation application by the operator OP through a terminal of the controller Q6, the dark image acquiring operation is immediately stopped. When the dark image acquiring operation in progress is stopped in this manner, a flag (readout scheme storage means) (not shown) which is set in the memory controller 13 and indicates that acquisition has been performed immediately before the operation is stopped is set. If, for example, storage operation is stopped during dart image acquisition operation in mode ③, a flag indicating mode ③ is set.

The significance of this flag will be described next. In general, a period during which no radiation is incident or the time when incidence of radiation is resumed is not determined because the object setting time and the like are indefinite. It is generally expected that while dark image data is acquired in a given mode, the acquiring operation must be stopped unexpectedly. In such a situation, if the flag indicating the mode in which dark image acquisition is currently performed is set when radiation application is resumed during dark image acquisition (or set in advance during acquisition), dark image acquisition can be resumed from the mode corresponding to the previously set flag when radiation application is stopped next. This makes it possible to avoid unnecessary acquiring operation. In addition, dark image data associated with modes ① to ⑤, which correspond to the operation state of the diagnosis apparatus Q from moment to moment, can always be prepared in the correction data memory unit 4.

In a completely initial state immediately after start-up of the diagnosis apparatus Q, the apparatus may operate first in the "dark image acquisition state", and may be kept in this state until the "radiation image acquisition state" begins.

In dark image acquisition performed in each mode, dark image data with higher quality can be obtained if dark image data acquired by a plurality of number of operations in each mode are added and averaged, and each average value is stored in the correction data memory unit 4. That is, if the average value of dark image data acquired a plurality of number of times in each mode is calculated, the corresponding noise can be reduced.

It is convenient that dark image acquisition is automatically performed during a non-radiation application period. In some cases, however, manual operation may be allowed such that dark image acquisition can be performed at an arbitrary time by operating the terminal of the controller Q6.

As described above, when charge information is read out from the pixel electrodes 1 (including the shield pixel electrodes 1A) in the "radiation image acquisition state", and dark images corresponding to the respective modes are stored in the correction data memory unit 4 in the "dark image acquisition state", actual correction operation is performed next to obtain accurate image information. At this time, in addition to the above charge information and dark images, readouting section gain noise and readouting section offset noise associated with "only" the signal readouting section Q2 are obtained in advance by electrically disconnecting the radiation detecting section Q1 from the signal readouting section Q2, and these obtained values are also used for the above correction.

Prior to a description of correction, note that reference symbol "i" indicates a row number in the matrix of the pixel electrodes 1; and reference symbol "j", a column number in the matrix. Let $X_{(i,j)}$ be the true (accurate) output from the pixel electrode 1 on the ith row/jth column, $a_{(i,j)}$ be the gain noise (detecting section gain noise) component in the same pixel electrode 1, $b_{(i,j)}$ be the detecting section offset noise including the dark current generated in the photoelectric conversion film in the same pixel electrode 1, $c_{(j)}$ be the readouting section gain noise in the signal readouting section Q2, and $d_{(j)}$ be the readouting section offset noise. In addition, "line artifact noise $n_{(i)}$" described in "BACKGROUND OF THE INVENTION" will be introduced again.

Of the above values, the readouting section gain noise $c_{(j)}$ and readouting section offset noise $d_{(j)}$ are known as described above, and hence will be treated so hereinafter. The reason why the above line artifact noise $n_{(i)}$ is produced and its nature have already been described, but will be briefly described again. The charge stored in a capacitor virtually formed at the intersection of the gate line $G_{(i)}$ and the signal line $S_{(j)}$ as shown in FIG. 7 becomes a component of the line artifact noise $n_{(i)}$. This component momentarily changes with variations in the voltage of the gate line $G_{(i)}$. For the very reason, such a component becomes a noise component unique to each row of the matrix.

Figure 8:
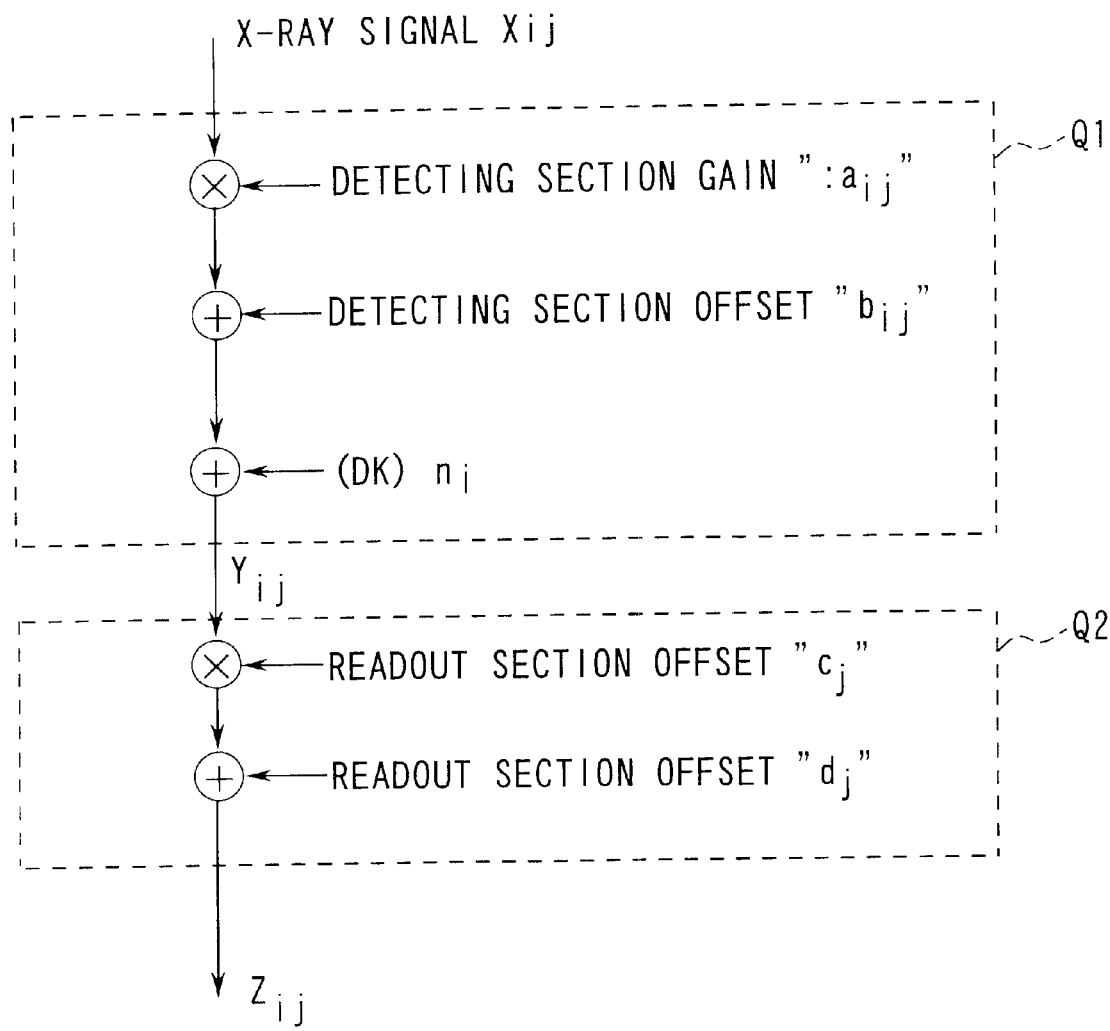
FIG. 8 is a view showing a noise occurrence mechanism in the first embodiment of the present invention.
Figure 9A:
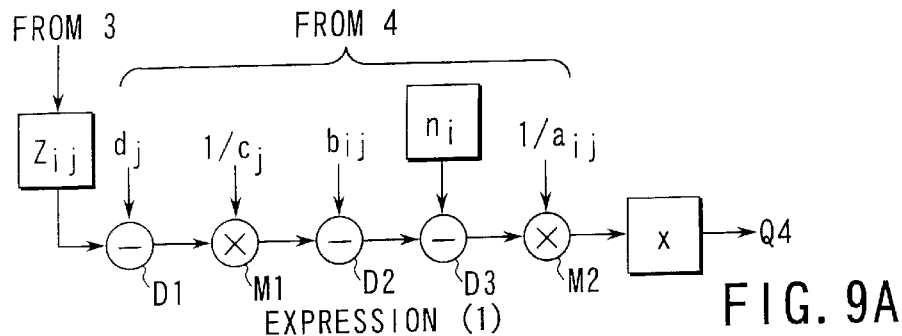
FIGS. 9A to 9G are views showing the arrangements of various calculator units in the first embodiment of the present invention.
Figure 9B:
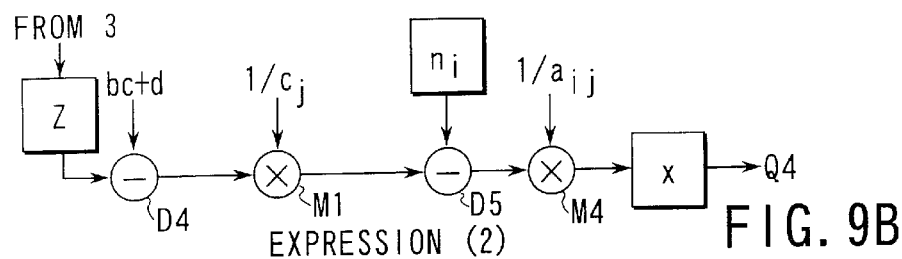
Figure 9C:
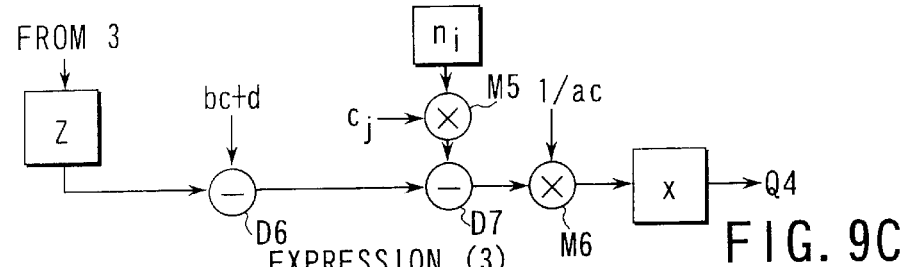
Figure 9D:
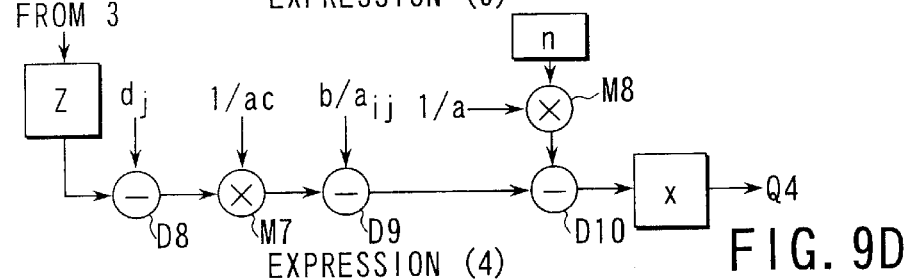
Figure 9E:
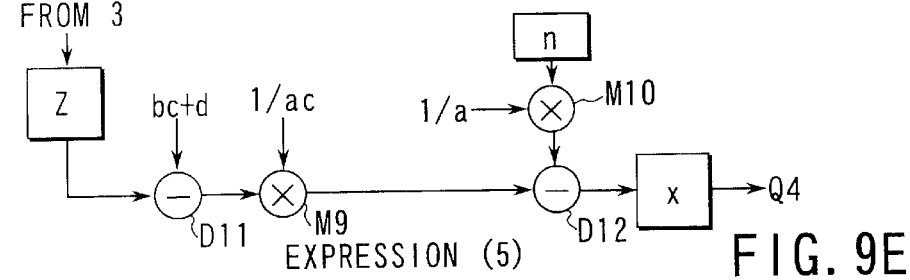
Figure 9F:
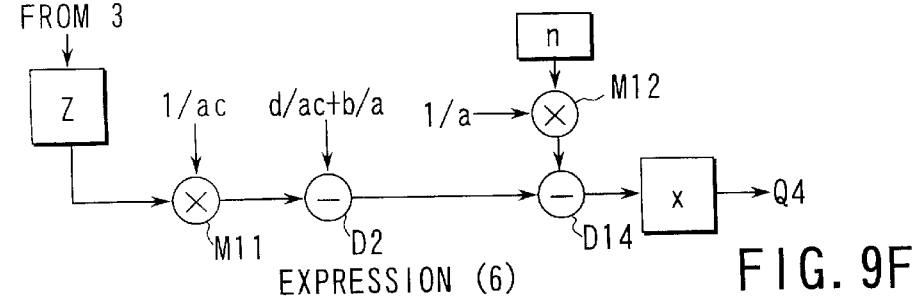
Figure 9G:
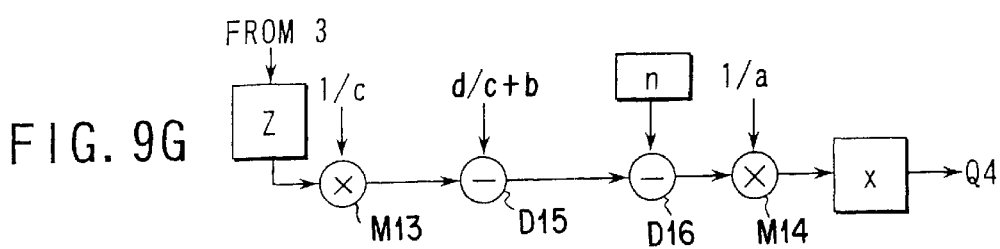

As shown in FIG. 8, with the use of the reference symbols and the like introduced in the above preparation, a detection signal $Z_{(i,j)}$ directly obtained by the radiation detector Q can be expressed by equation (A) given below:

$$Z_{(i,j)} = c_{(j)} \cdot (a_{(i,j)} \cdot X_{(i,j)} + b_{(i,j)} + n_{(i)}) + d_{(j)} \quad (A)$$

where a is the gain noise in the radiation detecting section Q1, which is an eigenvalue for each pixel (i, j), b is the offset of the radiation detecting section Q1, which is an eigenvalue for each pixel (i, j), c is the gain noise in the signal readouting section Q2, which is an eigenvalue for each signal line (j), d is the offset noise in the signal readouting section Q2, which is an eigenvalue for each signal line (j), n is line artifact noise which is a value that varies with time for each gate line (i), and X be the true value corresponding to the incident radiation intensity.

The true detection signal $X_{(i,j)}$ to be obtained is influenced by the gain noise $a_{(i,j)}$ in the pixel electrode 1 and the offset noise $b_{(i,j)}$ including the dark current in the photoelectric conversion film. In addition, the line artifact noise $n_{(i)}$ is added to this signal. The resultant signal is then read out from the matrix through the signal line $S_{(j)}$. When the signal passes through the amplifier 6 afterward, the readouting section gain noise $c_{(j)}$ influences the overall signal, and the readouting section offset noise $d_{(j)}$ is added to it. The signal $Z_{(i,j)}$ formed in this manner is apparent image information that is simply read out from the pixel and has not undergone any correction. The purpose of this correction is therefore to obtain $\alpha \cdot X_{(i,j)} + \beta$ (where $\alpha$ and $\beta$ do not depend on gate lines, temperatures, and acquisition modes) by reducing variation components such as $c_{(j)}$, $a_{(i,j)}$, $b_{(i,j)}$, $n_{(i)}$, and $d_{(j)}$.

First of all, the acquisition result of dark image data is evaluated according to equation (A). Assume that data obtained by acquiring a plurality of dark image data and calculating the average value of the sum of dark image data is used as dark image data. Since mode ① is assumed in this embodiment, the dark image data associated with mode ① will be considered below. Note additionally that this average data is stored in the single correction data memory unit 4 associated with mode ①.

If dark image data is assumed in equation (A), since no radiation is incident, $X_{(i,j)}=0$. In addition, since the data are added/averaged, it can be assumed that line artifact noise is canceled out, and $n_{(i)}=0$. That is, the following is obtained:

$$Z_{(i,j)} = c_{(j)} \cdot b_{(i,j)} + d_{(j)}$$

In other words, this data is stored in the single boot portion 4 associated with mode ①.

Subsequently, image data obtained by directly applying radiation onto the detector without the mediacy of an object (this data will be referred to as direct radiation image data (direct radiation information) hereinafter) is evaluated. Note that this direct radiation image data is acquired before the "radiation image acquisition state". In addition, data obtained by adding a plurality of acquired images and averaging the sum of image data is used for correction as in the case of dark image acquisition.

The signal $Z_{(i,j)}$ obtained in this case is given as follows by adding/averaging processing using equation (A) in consideration of $n_{(i)}=0$:

$$Z_{(i,j)} = c_{(j)} \cdot a_{(i,j)} \cdot X_{(i,j)} + c_{(j)} \cdot b_{(i,j)} + d_{(j)}$$

In this case, $X_{(i,j)}$ represents direct incidence of radiation onto the pixel electrode 1, and hence can be theoretically obtained. In addition, since "$C_{(j)} \cdot b_{(i,j)} + d_{(j)}$" can be obtained by referring to the above correction data memory unit 4 described above, "$c_{(j)} \cdot a_{(i,j)}$" can be obtained. That is, a so-called "total gain noise" can be obtained, which is the product of the detecting section gain noise $a_{(i,j)}$ in detecting element of the pixel electrode 1 on the ith row/jth column and the readouting section gain noise $c_{(j)}$ in the amplifier 6 on the jth column.

The value of the line artifact noise $n_{(i)}$ is obtained by using an output from the shield pixel electrode 1A disposed in the radiation detecting section Q1. In this case, the output has already been acquired in a readout of charge information after the radiation image acquisition state, as described above. Since no radiation is applied onto the shield pixel electrode 1A, $X_{(i,j)}=0$, i.e., $X_{(i,1)}=0$ (see FIG. 3). If this equation is substituted into equation (A) then $$Z_{(i,1)}=C_{(1)} \cdot n_{(i)}+C_{(1)} \cdot b_{(i,1)}+d_{(1)} \qquad (C)$$

In this case, "$C_{(1)} \cdot b_{(i,1)}+d_{(1)}$" represents the charge information output from the shield pixel electrode 1A on the ith row of the matrix, and its value is known. Therefore, the ith-row line artifact noise $n_{(i)}$ in a specific image can be obtained from the above equation.

That is, the line artifact noise $n_{(i)}$ can be obtained by calculating $$(Z_{(i,1)}-(C_{(1)} \cdot b_{(i,1)}+d_{(1)})/C_{(1)}$$

according to equation (C). In this case, as will be described later, if $c_{(1)}$ is set to be different from $c_{(j)}$ (j≠1), $n_{(i)}$ can be obtained with higher precision.

In this case, since $Z_{(i,1)}$ and "$C_{(1)} \cdot b_{(i,1)}+d_{(1)}$" in the above mathematical expression are in the same condition in terms of incidence of no radiation, the same value ($Z_{(i,1)}=C_{(1)} \cdot b_{(i,1)}+d_{(1)}$) is apparently obtained. It therefore seems as if $n_{(i)}$ cannot be effectively obtained but it is not true.

This is because "c·b+d" is essentially "dark image data" in the shield pixel electrode 1A and is acquired in the "dark image acquisition state", i.e., before no radiation is incident after start-up of the apparatus or in a period during which no radiation is incident on the radiation detecting section Q1, as described above. This component consists of the offset containing a dark current in the photoelectric conversion film. On the other hand, $Z_{(i,1)}$ is acquired when charge information is read out from each pixel electrode 1 in mode ① after the "radiation image acquisition state". This component is therefore output from the shield pixel electrode 1A as a component influenced by the driving of the gate line G, and more specifically, a component containing a line artifact noise $n_i$ component produced by voltage fluctuations. Therefore, the two components basically differ in nature. Since $Z_{(i,1)}-(C_{(1)} \cdot b_{(i,1)}+d_{(1)})\neq 0$ generally holds, $n_{(i)}$ can be effectively obtained.

With the processing described so far, the readouting section gain noise $c_{(j)}$ in the amplifier 6 on the jth column, the offset noise $d_{(j)}$ in the amplifier 6, the total gain noise $c_{(j)} \cdot a_{(i,j)}$, the dark image data "$c_{(j)} \cdot b_{(i,j)}+d_{(j)}$", and the line artifact noise $n_{(i)}$ are obtained. In addition, the value of the gain noise $a_{(i,j)}$ can be singly acquired in advance by injecting predetermined charge (predetermined input signal) into each pixel electrode 1 using an array tester after the radiation detecting section Q1 is electrically disconnected from the signal readouting section Q2, and reading out the charge, as in the case wherein the readouting section gain noise $c_{(j)}$ and the like are obtained. Obviously, since the total gain noise $c_{(j)} \cdot a_{(i,j)}$ has already been obtained, the pixel electrode gain noise $a_{(i,j)}$ may be obtained by dividing $c_{(j)} \cdot a_{(i,j)}$ by the readouting section gain noise $c_{(j)}$ that has also been obtained already.

In the above manner, the detecting section gain noise $a_{(i,j)}$, detecting section offset noise $b_{(i,j)}$, readouting section gain noise $c_{(j)}$, readouting section offset noise $d_{(j)}$, and line artifact noise $n_{(i)}$ are obtained. These correction data are stored in the correction data memory unit 4 singly or as data having undergone arithmetic operation corresponding to a correction procedure.

The correction procedure and the arrangement of the calculator unit 11 will be described next.

First of all, equation (A) is modified into mathematical expressions for the detection signal $X_{(i,j)}$ to be actually obtained with respect to the observed detection signal $Z_{(i,j)}$ as follows:

$$X_{(i,j)}=\{(Z_{(i,j)}-d_{(j)})/c_{(j)}-b_{(i,j)}-n_{(i)}\}/a_{(i,j)} \qquad (1)$$

$$X_{(i,j)}=\{(Z_{(i,j)}-(b_{(i,j)} \cdot c_{(j)}+d_{(j)}))/c_{(j)}-n_{(i)}\}/a_{(i,j)} \qquad (2)$$

$$X_{(i,j)}=\{Z_{(i,j)}-(b_{(i,j)} \cdot c_{(j)}+d_{(j)})-n_{(i)} \cdot c_{(j)}\}/(a_{(i,j)} \cdot c_{(j)}) \qquad (3)$$

$$X_{(i,j)}=(Z_{(i,j)}-d_{(j)}/(a_{(i,j)} \cdot c_{(j)})-b_{(i,j)}/a_{(i,j)}-n_{(i)}/a_{(i,j)} \qquad (4)$$

$$X_{(i,j)}=(Z_{(i,j)}-d_{(j)}-b_{(i,j)} \cdot c_{(j)})/(a_{(i,j)} \cdot c_{(j)})-n_{(i)}/a_{(i,j)} \qquad (5)$$

$$X_{(i,j)}=Z_{(i,j)}/(a_{(i,j)} \cdot c_{(j)}-d_{(j)}/(a_{(i,j)} \cdot c_{(j)})-b_{(i,j)}/a_{(i,j)}-n_{(i)}/a_{(i,j)} \qquad (6)$$

$$X_{(i,j)}=\{Z_{(i,j)}/C_{(j)}-(d_{(j)}/C_{(j)}+b_{(i,j)})-n_{(i)}\}/a_{(i,j)} \qquad (7)$$

A correction procedure and the arrangement design of the calculator unit 11 are determined in accordance with any one of correction expressions (1) to (7).

The present inventors have made a study to find out an optimal expression to be implemented from the viewpoint of the number of memories required, the number of calculators required, the number of calculation steps, and the number of calculations. FIGS. 9A to 9F show the arrangements of the calculator unit 11 corresponding to the respective expressions.

The correction expressions corresponding to the respective correction expressions ((1) to (7)) and the arrangements of the calculator unit 11 corresponding to the respective correction expressions ((1) to (7)) will be described below.

According to correction expression (1), first of all, a difference calculator D1 subtracts a correction value d from a detection signal Z. A multiplier M1 multiplies the output (z–d) from the difference calculator D1 by a reciprocal of the readouting section gain noise c (=1/c). A difference calculator D2 subtracts b from the product ((z–d)/c). A difference calculator D3 subtracts line artifact noise n from the output from the difference calculator D2. Finally, a multiplier M2 multiplies the resultant value {(z–d)/c–b–n} by 1/a. In this case, 1/c and 1/a that are calculated in advance are stored in the correction data memory unit 4. Note that the difference calculator D2 may execute subtraction of b after subtraction of n by the difference calculator D3.

According to correction expression (2), first of all, a difference calculator D4 subtracts a correction value (b·c+d) from the detection signal Z. A multiplier M3 multiplies the output from the difference calculator D4 by 1/c. A difference calculator D5 subtracts n from the product. Finally, a multiplier M4 multiplies the output from the difference calculator D5 by 1/a. In this case, (b·c+d), 1/c, and 1/a that are calculated in advance are stored in the correction data memory unit 4.

According to correction expression (3), first of all, a difference calculator D6 subtracts the correction value (b·c+d) from the detection signal Z. A difference calculator D7 subtracts the product of n and c, obtained by a multiplier M5, from the output from the difference calculator D6. Finally, a multiplier M6 multiplies the output from the difference calculator D7 by 1(a·c). In this case, (b·c+d) and 1/(a·c) that are calculated in advance are stored in the correction data memory unit 4. Note that the difference calculator D6 may execute subtraction of the correction value (b·c+d) after subtraction of (n·c) by the difference calculator D7.

According to correction expression (4), first of all, a difference calculator D8 subtracts a correction value d from the detection signal Z. A multiplier M7 multiplies the output from the difference calculator D8 by $1/(a \cdot c)$. A difference calculator D9 subtracts $b/a$ from the product. A difference calculator D10 then subtracts the product of n and $1/a$, obtained by a multiplier M8, from the output from the difference calculator D9. In this case, $1/(a \cdot c)$, $b/a$, and $1/a$ that are calculated in advance are stored in the correction data memory unit 4. Note that the difference calculator D9 may execute subtraction of $b/a$ after subtraction of $(n/a)$ by the difference calculator D10.

According to correction expression (5), first of all, a difference calculator D11 subtracts the correction value $(b \cdot c + d)$ from the detection signal z. A multiplier M9 multiplies the output from the difference calculator D11 by $1/(a \cdot c)$. Finally, a difference calculator D12 subtracts the product of n and $1/a$, obtained by a multiplier M10, from the output from the multiplier M9. In this case, $(b \cdot c + d)$, $1/(a \cdot c)$, and $1/a$ that are calculated in advance are stored in the correction data memory unit 4.

According to correction expression (6), first of all, a multiplier M11 multiplies the detection signal Z by $1/(a \cdot c)$. A difference calculator D13 subtracts a correction value $(d/(a \cdot c) + b/a)$ from the product. Finally, a difference calculator D14 subtracts the product of n and $1/a$, obtained by a multiplier M12, from the output from the difference calculator D13. In this case, $(d/(a \cdot c) + b/a)$, $1/(a \cdot c)$, and $1/a$ that are calculated in advance are stored in the correction data memory unit 4. Note that the difference calculator D13 may execute subtraction of the correction value $(d/(a \cdot c) + b/a)$ after subtraction of $(n/a)$ by the difference calculator D14.

According to correction expression (7), first of all, a multiplier M13 multiplies the detection signal Z by $1/C$. A difference calculator D15 subtracts a value $(b \cdot c + d)$ from the output $(z/c)$ from the multiplier M13. A difference calculator D16 subtracts a line artifact noise n from the output $(z/c-(d \cdot c + b))$ from the difference calculator D15. Finally, a multiplier M14 multiplies the output from the difference calculator D16 by $(1/a)$. In this case, $(b \cdot c + d)$, $1/c$, and $1/a$ that calculated in advance are stored in the correction data memory unit 4.

The true value X can be obtained by using any of these correction expressions. However, the present inventors have selected an optimal correction expression to be implemented in consideration of the number of memories required, the number of calculators required, the number of calculation steps, and the number of calculations.

As a result, the most suitable expression is correction expressions (2) and (7), the second most suitable expressions are correction expressions (1) and (3), and the third most suitable expression is correction expression (5).

The main reason why expressions (2), (7), (1), and (3) are selected is that the calculation using the readouting section gain noise c is executed before or concurrently with the calculation using the detecting section gain noise a, and the calculation using the readouting section gain noise c is executed before or concurrently with the calculation using the detecting section offset noise b. That is, the calculation using the readouting section gain noise c is executed before or concurrently with the calculations using the detecting section gain noise a and offset noise b. This makes it possible to greatly decrease the number of calculations for the following reason. The detecting section gain noise a and offset noise b exhibit eigenvalues for each pixel (i, j), and hence the number of calculations for them is i×j. However, since the readouting section gain noise c exhibits an eigenvalue for each signal line S, the number of calculations is j.

It is also important to execute the calculation using the readouting section gain noise c before or concurrently with the calculation using the line artifact noise n. This also contributes to a decrease in the number of calculations.

In the case of expressions (2) and (7), the merit is that calculating "n" for the shielded pixel is executed with calculating "n" for the nonshielded pixel.

In addition, the line artifact noise n output in real time is preferably handled as it is, i.e., the original value is preferably supplied for subtraction processing without any calculation with other data, in consideration of an increase in calculation speed.

In operation of obtaining the true value $X_{(i,j)}$ or the correction method, it is preferable that the latest dark image information "$C_{(j)} \cdot b_{(i,j)} + d_{(j)}$" acquired immediately before the operation be always used. In the embodiment described above, since the latest information "$C_{(j)} \cdot b_{(i,j)} + d_{(j)}$" is always stored in the correction data memory unit 4, it is easy to execute the above "preferable" processing.

As described above, according to the radiation detector and correction method of this embodiment, proper subtraction of dark images and correction can always be performed to contribute to the construction of accurate images unlike the prior art in which real-time correction cannot be performed in accordance with actual situations, which incessantly change, like changes in apparatus temperatures due to continuous operation of the radiation detector Q and the like.

In the prior art, it is difficult to acquire the readouting section gain noise $c_{(j)}$ required for correction, because the S/N ratio decreases due to the large signal line amplifier input capacitance based on an output from the detecting section. In contrast to this, according to this embodiment, since the radiation detecting section Q1 can be electrically disconnected from the signal readouting section Q2, such gain noise can be easily acquired, thus greatly contributing to the execution of accurate correction.

Second Embodiment

The second embodiment of the present invention will be described below.

The second embodiment is designed to obtain more accurate line artifact noise $n_{(i)}$ by giving appropriate consideration to the manner in which voltages applied to gate lines G vary.

As indicated several times above, the line artifact noise $n_{(i)}$ is produced by variations in voltages applied to the gate lines G and the presence of capacitances at the intersections of the gate lines G and signal lines S. Such voltage variations are caused by a gate line driver 2 for driving the gate lines G. As described with reference to FIG. 3, the gate line driver 2 is connected to the left end of each gate line $G_{(i)}$. This circuit system can be regarded as a system forming an RC circuit made up of the resistance of the gate line $G_{(i)}$ itself and intersection capacitances CX as shown in FIG. 10, considering that the gate lines G have resistances by themselves and the intersection capacitances are present.

Figure 10:
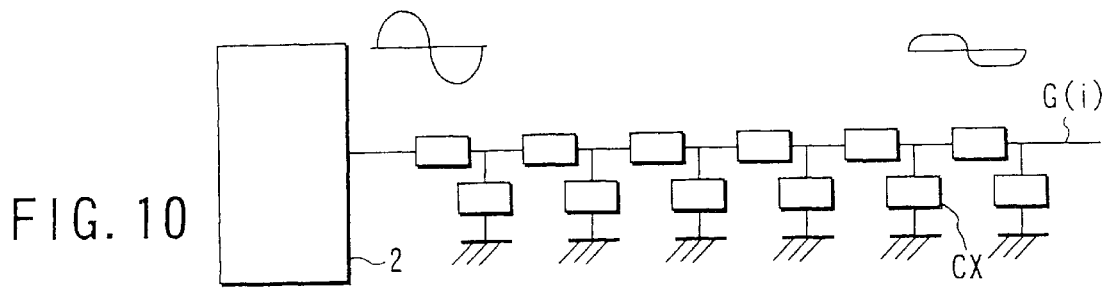
FIG. 10 is a view for explaining how an RC circuit system is constituted by a gate line and gate line driver in the second embodiment of the present invention.

As is obvious, the circuit system shown in FIG. 10 has the function of a low-pass filter. That is, in the process of transferring a voltage variation caused in the gate line driver 2 to the opposite side of the gate lines G, the high-frequency components are attenuated. Strictly speaking, therefore, the magnitude of line artifact noise $n_{(i)}$ changes in accordance with the distance from the gate line driver 2. That is, the line artifact noise $n_{(i)}$ is unique to each row of the matrix and a function of the column number j. In the second embodiment, therefore, line artifact noise is denoted by reference symbol $n_{(i,j)}$, in particular.

Figure 11:
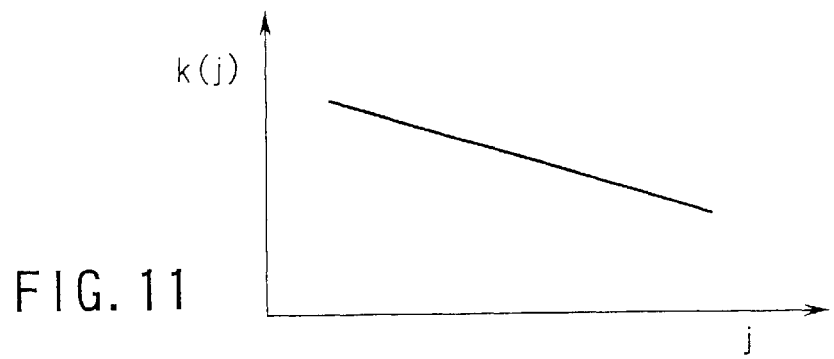
FIG. 11 is a graph schematically showing a function $k_{(j)}$ introduced to obtain line artifact noise $n_{(i,j)}$ in the second embodiment of the present invention.

In the second embodiment, proper compensation is made in calculating equation (4) in accordance with the properties of the line artifact noise $n_{(i,j)}$. More specifically, an amount $n_{(i)} \cdot k_{(j)}$ obtained by multiplying the line artifact noise $n_{(i)}$, obtained by using equation (3) on the basis of an output form a shield pixel electrode 1A, by a function $k_{(j)}$ that changes with the distance from the gate line driver 2 is used as the line artifact noise $n_{(i,j)}$ ($n_{(i,j)} = n_{(i)} \cdot k_{(j)}$) in placed of $n_{(i)}$ in equation (4). In this case, as shown in FIG. 11, the function $k_{(j)}$ monotonously decreases with an increase in distance from the gate line driver 2 (an increase in array $k_{(j)}$. This function $k_{(j)}$ may be obtained in advance by, for example, performing measurement before the manufacture of a radiation detecting section Q1, and stored in a memory 4 in FIG. 3.

This makes it possible to accurately evaluate the line artifact noise $n_{(i,j)}$, and allows very effective acquisition of accurate image information, i.e., $X_{(i,j)}$.

As described above in the description of the arrangement of the radiation detecting section Q1, an arrangement having a plurality of columns of shield pixel electrodes 1A in each side falls within the range of the present invention. A method of obtaining line artifact noise in such a case will be described in association with the introduction of the line artifact noise $n_{(i,j)}$.

Assume that the total number of columns of pixel electrodes 1 in the matrix is n, and the shield pixel electrode 1A is located at j=1 and j=m. As ith-row line artifact noises obtained from these columns, $n_{(i,1)}$ and $n_{(i,m)}$ are obtained by using equation (3) (the former is obtained from $Z_{(i,1)} = (C_{(1)} \cdot b_{(i,1)} + d_{(1)}) + c_{(1)} \cdot n_{(i,1)}$, and the latter is obtained from $Z_{(i,m)} = (C_{(m)} \cdot b_{(i,m)} + d_{(m)}) + c_{(m)} \cdot n_{(i,m)}$).

In general, the line artifact noise $n_{(i,j)}$ on the ith row/jth column is obtained by using these values according to, for example, the following equation:

$$n_{(i,j)} = n_{(i,1)} \cdot k1_{(j)} + n_{(i,m)} \cdot k2_{(j)}$$

Figure 12:
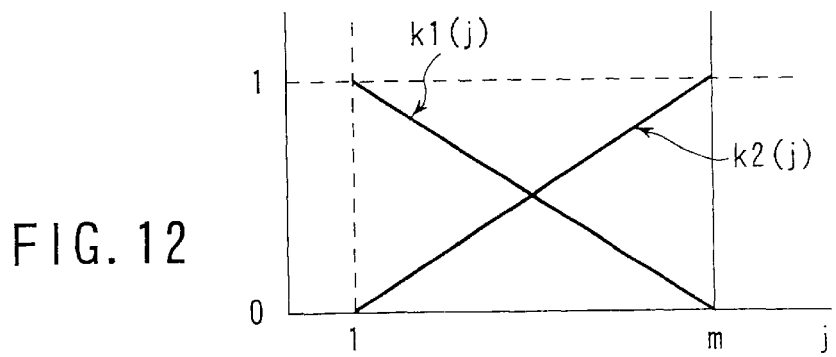
FIG. 12 is a graph schematically showing functions $k1_{(j)}$ and $k2_{(j)}$ introduced to obtain the line artifact noise $n_{(i,j)}$ when shield pixel electrodes are arranged on a plurality of columns in the second embodiment of the present invention.
Figure 13:
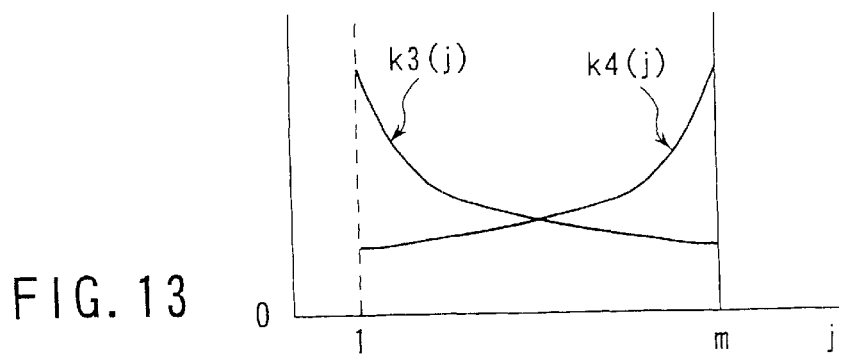
FIG. 13 is a graph schematically showing functions $k3_{(j)}$ and $k4_{(j)}$ introduced to obtain the line artifact noise $n_{(i,j)}$ when shield pixel electrodes are arranged on a plurality of columns in the second embodiment of the present invention.

In this case, for example, as shown in FIGS. 12 and 13, $k1_{(j)}$ and $k2_{(j)}$ are a monotonic decrease function and monotonic increase function, respectively, which satisfy the condition of $k1_{(1)}=1$, $k1_{(m)}=0$, $k2_{(1)}=0$, and $k2_{(m)}=1$. Like $k_{(j)}$ described above, these functions can be obtained in advance at the time of manufacture of the radiation detecting section Q1. The k1 and k2 are replaced to k3 and k4, respectively.

Third Embodiment

The third embodiment of the present invention will be described below.

Figure 14:
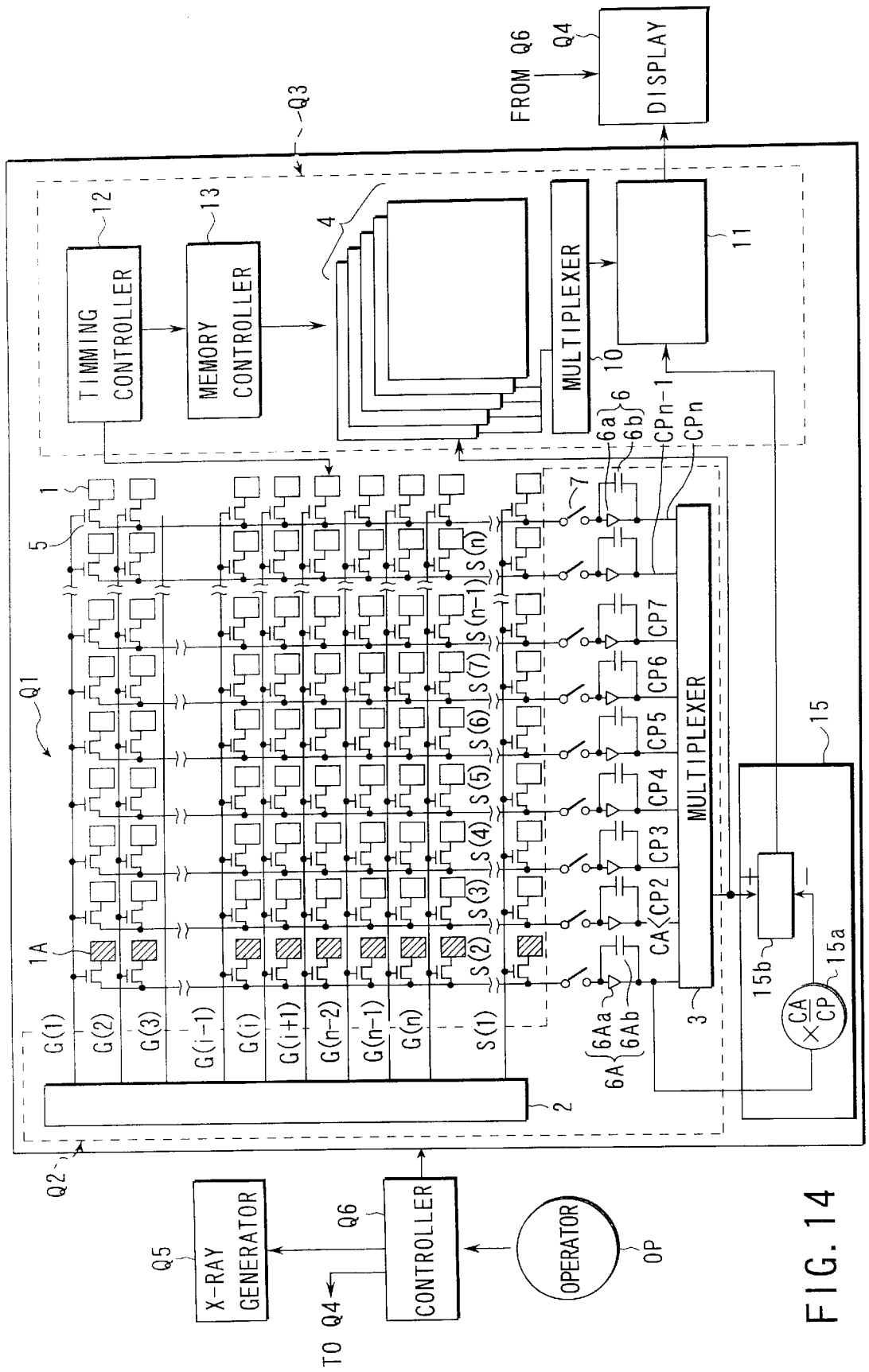
FIG. 14 is a circuit diagram showing the arrangement of a radiation detector according to the third embodiment of the present invention.

In the third embodiment, the apparatus arrangement shown in FIG. 14 differs from that shown in FIG. 3 in the arrangement of each amplifier 6 and a magnification correction difference calculator (magnification correction means) 15. The arrangements of these components will be described in detail below, together with their functions and effects.

As shown in FIG. 14, in the third embodiment, the arrangement of an amplifier 6A formed on a signal line $S_{(1)}$, on which the shield pixel electrodes 1A are arranged, slightly differs from that of each of amplifiers 6 formed on remaining signal lines $S_{(2)}, \ldots, S_{(n)}$. More specifically, the capacitance of a capacitor 6Ab of the former amplifier 6A is smaller than that of the latter amplifier 6. Referring to FIG. 14, CA<$CP_j$ (j=2, ..., n). In this case, $CP_{(j)}$ is the capacitance of a capacitor 6b of each of the amplifiers 6 on the 2nd, 3rd, ..., nth columns. Strictly speaking, since these capacitances differ in their values on the respective columns, variables are assigned thereto accordingly.

It is generally known that in the arrangement of the amplifier 6 shown in FIG. 12, as the capacitance of the capacitor decreases, the amplification factor increases. In this case, therefore, the amplification factor of the former amplifier 6A is larger than that of the latter amplifier 6.

As shown in FIG. 14, in the magnification correction difference calculator 15, a multiplier 15a multiplies (magnification correction) an output signal from the shield pixel electrode 1A by the ratio (CA/CP) of a capacitance CA of the capacitor of the amplifier 6A to a capacitance CP of the capacitor of the amplifier 6, and a difference calculator 15b subtracts the product from the output signal from the non-shield pixel electrode 1. In this case, the denominator "C" of "CA/C" expressed as the ratio of the capacitances of the capacitors in the multiplier 15a shown in FIG. 14 may be regarded as the reference symbol "C" representing the capacitance of each $CP_{(j)}$ or may be regarded as a reference symbol representing the arithmetic mean of the capacitances of $CP_{(j)}$, i.e., $C=(CP_{(2)}+ \ldots +CP_{(n)})/(n-1)$. Basically, either case can be arbitrarily selected. As shown in FIG. 15, an output from the magnification correction difference calculator 15 is transferred to a display Q4 through a difference calculator 9.

Such processing is performed for the following reasons. First of all, in general, in the arrangement of the amplifier 6 constituted by the integrating amplifier 6A and capacitor 6b, as the capacitance of the capacitor 6b decreases, its amplification factor increases, as described above. For this reason, even with a slight charge input, a high output voltage is obtained, and hence the output of the amplifier 6 tends to be saturated. This imposes a limitation on circuit design. In the non-shield pixel electrode 1, therefore, an optimal capacitor capacitance (i.e., $CP_{(j)}$) is automatically determined by the maximum amount of charge generated by radiation and the above limitation. On the other hand, in the shield pixel electrode 1A, no charge is generated by radiation, the amount of charge stored therein is, at most, a very small amount of charge obtained by integrating various kinds of leak currents. Therefore, the capacitance of the capacitor 6Ab of the amplifier 6A can be set to be smaller than that of the non-shield pixel electrode 1 (i.e., CA<$CP_{(j)}$) in consideration of the fact that the output of the amplifier 6 is not easily saturated.

The third embodiment therefore has the following merit. A detection signal associated with the shield pixel electrode 1A and obtained by the amplifier 6A and the subsequent components is hardly influenced by noise in the subsequent circuits. In other words, owing the high amplification factor, slight noise acting on the signal can be neglected. That is, the detection signal obtained in this manner can be regarded as a signal containing almost no noise.

As an output to be actually obtained, a value may be used, which is obtained by calculating the difference between an output from the non-shield pixel electrode 1 and an output from the shield pixel electrode 1A which has undergone magnification correction with a multiplication of the coefficient "CA/C" on the basis of the difference between the above capacitances of the capacitors. Referring to FIG. 14, the detection signal passing through the difference calculator 15b further passes through the difference calculator 9, in which the difference between the detection signal and dark image data is also calculated. The signal passing through the difference calculator 9 is finally input to the display Q4.

According to the third embodiment, when correction associated with the line artifact noise $n_{(i)}$ is to be executed in the above manner by using the means for differently amplifying pieces of charge information read out from each shield pixel electrode 1A and each non-shield image electrode 1, the correction can always be properly executed without amplifying noise unlike the prior art in which the noise may be amplified. obviously, this contributes to accurate image construction in the radiation detector Q according to the third embodiment.

In addition, the third embodiment has the following merit. In the first embodiment, in correcting the line artifact noise $n_{(i)}$, a subtraction of $(Z_{(i,1)}-(C_{(1)} \cdot b_{(i,1)}+d_{(1)}))$ is executed to solve equation (3) with respect to $n_{(i)}$. Instead of this operation, the arrangement of the third embodiment is applied to the arrangement shown in FIG. 3 to use $Z_{(i,1)}-(CA/CP_{\hat{j}}) \cdot (C_{(1)} \cdot b_{(i,1)}+d_{(1)})$. According to this form, the value of the line artifact noise $n_{(i)}$ can be obtained with higher precision. Note that the above statement "if $c_{(1)}$ is set to be different from $c_{(j)}$ ($j \neq 1$), $n_{(i)}$ can be obtained with higher precision" is made in consideration of the above situation (to change the amplification factor by changing the capacitance of a capacitor is to change gain noise).

Items that are associated with the present invention but have not been described in the above embodiments will be described below.

The above embodiments have been described with particular emphasis on mode ①. However, when the radiation detector Q is to be operated in accordance with other modes ① to ⑤, processing similar to that described above will be performed. In this case, as correction data memory units 4, memory units corresponding to the respective modes may be used. As is obvious, in this case as well, since dark images corresponding to modes ② to ⑤ are separately stored in a plurality of correction data memory units 4, the above effects can be obtained.

Each mode in the above embodiments has been described as a mode corresponding to the "gate line driving form" or "charge information readout form". In some cases, however, the following form may be employed. In this form, the "apparatus temperature" that changes in accordance with the operation state of the radiation detector Q is properly classified into stages, and dark image data corresponding to the respective stages are stored in the respective correction data memory units 4. In this case, for example, some kind of temperature detector is prepared for the diagnosis apparatus Q, and a dark image corresponding to an output from the detector is read out from the plurality of correction data memory units 4 to be used for correction.

In the above embodiments, the number of modes is limited to five. Obviously, however, the present invention is not limited to this. Basically, the number and types of modes can be arbitrarily selected. In this case, for example, the operator OP is likely to arbitrarily and newly set a desired mode that does not correspond to any of modes ① to ⑤ through the controller Q6. In such a case as well, the basic concept of the present invention, i.e., acquiring and using a dark image corresponding to a set mode, remains the same as in the embodiments described above.

Acquisition of the readouting section gain noise $c_{(j)}$ and the like will be additionally described below. According to the above description, the readouting section gain noise $c_{(j)}$ and readouting section offset noise $d_{(j)}$ are obtained by electrically separating the signal readouting section Q2 from the radiation detecting section Q1. In some cases, however, acquisition of the readouting section gain noise $c_{(j)}$ and readouting section offset noise $d_{(j)}$, which is generally performed by using the radiation detector having the signal readouting section Q2 fixed/connected with a TAB or the like, may be performed by calibrating only the signal readouting section Q2 in a manufacturing stage (initial manufacturing period) before the signal readouting section Q2 is fixed/connected, thereby obtaining the readouting section gain noise $c_{(j)}$ and readouting section offset noise $d_{(j)}$ in advance.

Furthermore, calibration in this method, which is performed with respect to only the signal readouting section Q2 to obtain the readouting section gain noise $c_{(j)}$ and readouting section offset noise $d_{(j)}$, may be executed not only in a manufacturing period but also in a periodic test at the time of star-up or the like, thereby updating the value $c_{(j)}$ and the like. In such a case, since the value $c_{(j)}$ and the like are updated (i.e., acquired) without disconnecting the radiation detecting section Q1 from the signal readouting section Q2, the input capacitance of the amplifier of the signal readouting section Q2 increases, resulting in a deterioration in measurement precision. However, by averaging a plurality of measurement results, high precision can be easily maintained. In addition, driving of all the gate lines G is preferably stopped to input signals to only the signal readouting section Q2 in order to minimize the influences of calibration input on the radiation detecting section Q1.

In addition, a structure capable of physical disconnection, e.g., a connector, may be disposed between the signal readouting section Q2 and the radiation detecting section Q1 instead of fixing/connecting the signal readouting section Q2 with a TAB or the like. In this case, the readouting section gain noise $c_{(j)}$ and readouting section offset noise $d_{(j)}$ may be acquired by executing the above calibration after the "physical disconnection".

Dark image data will be additionally described below. Each of the first type offset noise and second type offset noise indicated as factors that cause variations in dark image data is generally made up of two components, i.e., a component dependent on the amount of radiation applied and a component independent thereof. The radiation dependent component is determined in accordance with the potential difference between the signal line S and the charge stored in the pixel electrode 1 in accordance with the amount of radiation applied. The radiation independent component is determined in accordance with the potential difference between the pixel electrode 1 and the signal line S after charge information is read out from the pixel electrode 1. Assume that the radiation detector Q of this embodiment is used for a fluoroscopic examination and angiography called DA photographing on the basis of this classification. In these operations, since the radiation signal amount is very small, a change in the potential of the pixel electrode 1 due to the radiation signal amount can be almost neglected. As a consequence, in the above dark image correction in which the above radiation dependent component is smaller, in particular, the good effect of the correction can be obtained under an advantageous condition without posing any practical problems.

As is also obvious from the claims in this specification, the present invention can be recognized as an invention having three aspects. The first aspect of the present invention is associated with the arrangement and method which allow acquisition of gain noise and offset noise associated with the radiation detecting section Q1 and signal readouting section Q2. The second aspect of the present invention is associated with the correction of line artifact noise and the arrangement of each amplifier. The third aspect of the present invention is associated with the arrangement having a plurality of correction data memory units and the correction method therefor. According to the above description, especially preferable three embodiments can be provided by properly combining the three aspects of the present invention. Essentially, for example, these aspects can be independently executed or arbitrary two of the three aspects can be combined and executed. As is obvious from the above description, such embodiments can be easily implemented and sufficient disclosure has been made for the implementation. Therefore, no further detailed description of this embodiment will be made. Note, in brief, that the present invention incorporates, for example, even the form of separately executing the three aspects of the present invention.

In this embodiment, there is no description that specifies the number of pixel electrodes 1. As is obvious from the gist of the present invention, however, the number of pixel electrodes 1 can be arbitrarily set. In addition, in the above description, the expression "gate lines $G_{(n)}$ and signal lines $S_{(n)}$" does not means that the matrix should be square. As is known, rectangular matrixes are more popular. Therefore, the above symbol "n" should be recognized as a symbol having only a meaning equivalent to "plural" or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radiation detector noise reduction method comprising the steps of:
   detecting incident radiation with a radiation detecting section, the radiation detecting section having a plurality of pixels arrayed in matrix;
   reading out the detection signal from the radiation detecting section through a readouting section; and
   correcting the readout detection signal with a correction section,
   wherein the correction step includes the first sub-step of correcting the detection signal on the basis of a first correction value corresponding to noise originating in the radiation detecting section, and the second sub-step of correcting the detection signal on the basis of a second correction value corresponding to noise originating in the readouting section, the second sub-step being executed before the first sub-step.

2. A method according to claim 1, wherein the second correction value corresponds to gain noise in the readouting section.

3. A method according to claim 1, wherein the first correction value corresponds to gain noise in the radiation detecting section and line artifact noise in the radiation detecting section, and the second correction value corresponds to gain noise in the readouting section.

4. A method according to claim 3, further comprising the step of acquiring the readouting section gain noise, the step of acquiring the readouting section gain noise including the sub-step of electrically separating the readouting section from the radiation detecting section, the sub-step of supplying a calibration signal to the readouting section, and the sub-step of obtaining the readouting section gain noise on the basis of an output signal from the readouting section which responds to the supplied calibration signal.

5. A method according to claim 3, further comprising the step of acquiring the detecting section gain noise, the step of acquiring the detecting section gain noise including the sub-step of electrically separating the readouting section from the radiation detecting section, the sub-step of supplying a calibration signal to the detecting section, and the sub-step of obtaining the detecting section gain noise on the basis of an output signal from the readouting section which responds to the supplied calibration signal.

6. A method according to claim 3, wherein information of the readouting section gain noise is measured in advance in an initial stage in manufacturing the readouting section and stored in the correction section.

7. A method according to claim 3, wherein information of the detecting section gain noise is measured in advance in an initial stage in manufacturing the radiation detecting section and stored in the correction section.

8. A method according to claim 3, wherein information of the readouting section gain noise is acquired in a periodic test on the readouting section and stored in the correction section.

9. A method according to claim 3, wherein information of the detecting section gain noise is acquired in a periodic test on the detecting section and stored in the correction section.

10. A radiation detecting section noise reduction method comprising the steps of:
    detecting incident radiation with a radiation detecting section, the radiation detecting section having a plurality of pixels arrayed in the form of a matrix;
    reading out the detection signal from the radiation detecting section through a readouting section; and
    correcting the readout detection signal,
    wherein the correction step includes
    the first sub-step of subtracting a result obtained by adding offset noise in the readouting section to the product of the detecting section offset noise and the readouting section gain noise from the detection signal,
    the second sub-step of multiplying a difference result obtained in the first sub-step by the reciprocal of the readouting section gain noise,
    the third sub-step of subtracting line artifact noise in the detecting section from the multiplication result obtained in the second sub-step, and
    the fourth sub-step of multiplying the difference result obtained in the third sub-step by the reciprocal of gain noise in the detecting section.

11. A radiation detecting section noise reduction method comprising the steps of:
    detecting incident radiation with a radiation detecting section, the radiation detecting section having a plurality of pixels arrayed in the form of a matrix;
    reading out the detection signal from the radiation detecting section through a readouting section; and
    correcting the readout detection signal,
    wherein the correction step includes
    the first sub-step of subtracting offset noise in the readouting section from the detection signal,
    the second sub-step of multiplying the difference result obtained in the first sub-step by gain noise in the readouting section,
    the third sub-step of subtracting offset noise in the detecting section from the multiplication result obtained in the second sub-step,
    the fourth sub-step of subtracting line artifact noise in the detecting section from the difference result obtained in the third sub-step, and
    the fifth sub-step of multiplying the difference result obtained in the fourth sub-step by gain noise in the detecting section.

12. A radiation detecting section noise reduction method comprising the steps of:
- detecting incident radiation with a radiation detecting section, the radiation detecting section having a plurality of pixels arrayed in the form of a matrix;
- reading out the detection signal from the radiation detecting section through a readouting section; and
- correcting the readout detection signal,
- wherein the correction step includes
  - the first sub-step of subtracting a result obtained by adding offset noise in the readouting section to the product of offset noise in the detecting section and gain noise in the readouting section from the detection signal,
  - the second sub-step of subtracting a value obtained by multiplying line artifact noise in the detecting section by the gain noise in the readouting section from the difference result obtained in the first sub-step, and
  - the third sub-step of multiplying the difference result obtained in the second sub-step by the reciprocal of the product of gain noise in the detecting section and the gain noise in the readouting section.

13. A radiation detecting section noise reduction method comprising the steps of:
- detecting incident radiation with a radiation detecting section, the radiation detecting section having a plurality of pixels arrayed in the form of a matrix;
- reading out the detection signal from the radiation detecting section through a readouting section; and
- correcting the readout detection signal,
- wherein the correction step includes
  - the first sub-step of multiplying the detection signal by the reciprocal of the readouting section gain noise,
  - the second sub-step of subtracting a result obtained by adding the detecting section offset noise and a result obtained by multiplying the detection signal by the reciprocal of the readouting section gain noise from a result obtained in the first sub-step,
  - the third sub-step of subtracting line artifact noise in the detecting section from the multiplication result obtained in the second sub-step, and
  - the fourth sub-step of multiplying the difference result obtained in the third sub-step by the reciprocal of gain noise in the detecting section.

14. A radiation detector comprising:
- a radiation detecting section for detecting incident radiation, said radiation detecting section having a plurality of pixels arrayed in the form of a matrix;
- a readouting section for reading out a detection signal detected by said radiation detecting section from said radiation detecting section, said readouting section having a plurality of readout schemes which can be selectively used;
- a storage section for storing correction values corresponding to the readout schemes in correspondence with the readout schemes; and
- a correction section for correcting the output detection signal on the basis of the correction value selectively read out from said storage section in accordance with the readout scheme.

15. A detector according to claim 13, wherein said correction section comprises a subtractor for subtracting the correction value which is stored in said storage section and corresponds to the readout scheme from the detection signal.

16. A detector according to claim 14, further comprising a memory controller for storing, in said storage section in correspondence with the respective readout schemes, a value of an output signal from said radiation detecting section when substantially no radiation is incident.

17. A detector according to claim 16, wherein said memory controller starts write operation of said storage section when application of radiation onto said radiation detecting section is stopped, and stops the write operation when radiation is applied onto said radiation detecting section.

18. A detector according to claim 14, wherein
- said radiation detecting section comprises a plurality of gate lines, a plurality of signal lines intersecting the gate lines, and a plurality of pixels arranged near a plurality of intersections of the gate lines and the signal lines, each of the pixels including a pair of a photoelectric conversion element and a pixel electrode,
- said readouting section comprises a plurality of switching elements arranged between the pixel electrodes and the signal lines, the switching elements having gates to which the gate lines are connected, and a gate line driver for selectively applying a predetermined voltage to the gate line, and
- the plurality of readout schemes differ in procedures of driving the gate lines by the gate line driver.

19. A detector according to claim 18, wherein the plurality of readout schemes include a first readout scheme of separately driving the gate lines, a second readout scheme of driving the gate lines in units of predetermined groups, a third readout scheme of driving some of the gate lines by using the first or second readout scheme, and a fourth readout scheme of executing the first to third readout schemes upon shortening a driving time for the gate lines.

20. A detector according to claim 14, wherein the stored correction value is an average of a sum of correction values repeatedly acquired by the same readout scheme.

21. A radiation detector comprising:
- a radiation detecting section for detecting incident radiation, said radiation detecting section having a plurality of pixels arrayed in the form of a matrix;
- a readouting section for reading out the detection signal from said radiation detecting section; and
- a correction section for correcting the readout detection signal,
- wherein some of the plurality of pixels are substantially shielded against the radiation, and said correction section corrects signals from the pixels which are not shielded on the basis of signals from the shielded pixels.

22. A detector according to claim 21, wherein said readouting section comprises a plurality of amplifiers for amplifying signals from the pixels, the amplifier corresponding to the shielded pixel having an amplification factor is higher than that of the amplifier corresponding to the pixel which is not shielded.

23. A detector according to claim 22, wherein the amplifiers include capacitors, the capacitor of the amplifier corresponding to the shielded pixel having a capacitance is smaller than that of the amplifier corresponding to the pixel which is not shielded.

24. A detector according to claim 22, further comprising:
- a multiplier for multiplying an output signal from the shielded pixel by a ratio of the capacitance of the capacitor of the amplifier corresponding to the pixel which is not shielded to the capacitance of the capacitor of the amplifier corresponding to the shielded pixel; and a subtractor for subtracting the product from an output signal from the pixel which is not shielded.

25. A radiation detector comprising:
a radiation detecting section for detecting incident radiation, said radiation detecting section having a plurality of pixels arrayed in the form of a matrix;
a readouting section for reading out the detection signal from said radiation detecting section; and
a correction section for correcting the readout detection signal,
wherein first pixels of the plurality of pixels which are located on one end, and second pixels thereof which are located on the other end are substantially shielded against the radiation, and said correction section corrects signals from the pixels which are not shielded on the basis of signals from said first and second pixels.

26. A detector according to claim 25, wherein said correction section corrects signals from the pixels which are not shielded on the basis of distance interpolation values between signals from the first and second pixels.

27. A radiation detector comprising:
a radiation detecting section for detecting incident radiation, said radiation detecting section having a plurality of pixels arrayed in the form of a matrix;
a readouting section for reading out the detection signal from said radiation detecting section; and
a plurality of switching elements for separating said readouting section from said radiation detecting section.

28. A detector according to claim 27, further comprising:
a calibration signal generator for supplying a calibration signal to said readouting section separated from said radiation detecting section by said switching elements;
a calculation section for calculating a correction value on the basis of an output signal from said calibration signal generator which responds to the calibration signal; and
a correction section for correcting a signal read out from said radiation detecting section through said readouting section on the basis of the correction value.

29. A detector according to claim 28, wherein the correction value corresponds to gain noise and/or offset noise in said readouting section.

30. A detector according to claim 29, wherein information of the readouting section gain noise is acquired in an initial manufacturing period for said readouting section, and stored in said correction section.

31. A detector according to claim 29, wherein the information of the readout gain noise is acquired in a periodic test on said readouting section and stored in said correction section.

32. A detector according to claim 29, wherein the information of the readout gain noise is independently obtained as an eigenvalue for each column of pixels.

33. A radiation diagnostic system comprising
a radiation generating unit;
a radiation detector detecting a radiation through a subject from said radiation generating unit;
a display unit displaying an image based on an output of said radiation detector; and
a control unit controlling said radiation generating unit, said radiation detector and said display unit, wherein said radiation detector including:
a radiation detecting section for detecting incident radiation, said radiation detecting section having a plurality of pixels arrayed in the form of a matrix;
a readouting section for reading out a detection signal detected by said radiation detecting section from said radiation detecting section, said readouting section having a plurality of readout schemes which can be selectively used;
a storage section for storing correction values corresponding to the readout schemes in correspondence with the readout schemes; and
a correction section for correcting the output detection signal on the basis of the correction value selectively read out from said storage section in accordance with the readout scheme.

34. A radiation diagnostic system comprising
a radiation generating unit;
a radiation detector detecting a radiation through a subject from said radiation generating unit;
a display unit displaying an image based on an output of said radiation detector; and
a control unit controlling said radiation generating unit, said radiation detector and said display unit, wherein said radiation detector including:
a radiation detecting section for detecting incident radiation, said radiation detecting section having a plurality of pixels arrayed in the form of a matrix;
a readouting section for reading out the detection signal from said radiation detecting section; and
a correction section for correcting the readout detection signal,
wherein some of the plurality of pixels are substantially shielded against the radiation, and said correction section corrects signals from the pixels which are not shielded on the basis of signals from the shielded pixels.

35. A radiation diagnostic system comprising
a radiation generating unit;
a radiation detector detecting a radiation through a subject from said radiation generating unit;
a display unit displaying an image based on an output of said radiation detector; and
a control unit controlling said radiation generating unit, said radiation detector and said display unit, wherein said radiation detector including:
a radiation detecting section for detecting incident radiation, said radiation detecting section having a plurality of pixels arrayed in the form of a matrix;
a readouting section for reading out the detection signal from said radiation detecting section; and
a plurality of switching elements for separating said readouting section from said radiation detecting section.

* * * * *